US011639107B2

(12) United States Patent
Szczerba et al.

(10) Patent No.: US 11,639,107 B2
(45) Date of Patent: May 2, 2023

(54) VEHICLE ELECTRONIC DISPLAY CONFIGURED TO FLEX AND/OR FOLD FOR ENHANCED USABILITY AND VIEWING

(71) Applicant: GM GLOBAL TECHNOLOGY OPERATIONS LLC, Detroit, MI (US)

(72) Inventors: Joseph F. Szczerba, Grand Blanc, MI (US); Xinyu Du, Oakland Township, MI (US); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 390 days.

(21) Appl. No.: 16/823,950

(22) Filed: Mar. 19, 2020

(65) Prior Publication Data

US 2021/0291660 A1 Sep. 23, 2021

(51) Int. Cl.
*B60K 37/02* (2006.01)
*G06F 1/16* (2006.01)
*G09F 9/30* (2006.01)

(52) U.S. Cl.
CPC ............ *B60K 37/02* (2013.01); *G06F 1/1681* (2013.01); *G09F 9/301* (2013.01); *B60K 2370/67* (2019.05); *B60K 2370/744* (2019.05)

(58) Field of Classification Search
CPC ...... G09F 9/301; G09F 21/049; G06F 1/1641; G06F 1/1601; G06F 1/1652; G06F 1/1681; G06F 2200/1612; B60K 35/00; B60K 37/02; B60K 2370/67; B60K 2370/691; B60K 2370/48; B60K 2370/1533;
(Continued)

(56) References Cited

U.S. PATENT DOCUMENTS 10,867,588 B2 * 12/2020 Hélot ................... B60K 35/00
2009/0161302 A1 * 6/2009 Ferren ................ B60R 11/0235
361/679.01
(Continued)

FOREIGN PATENT DOCUMENTS

CN        203580658 U      5/2014
DE    102014221092 A1      4/2016
(Continued)

OTHER PUBLICATIONS

Office Action dated Nov. 10, 2021 from German Patent Office for German Patent Application No. 102021102810.8; 5 pages.

*Primary Examiner* — Christopher E Leiby

(57) ABSTRACT

A display assembly for a vehicle includes an electronic display and an adjustment mechanism. The electronic display is configured to be mounted to an instrument panel of the vehicle. The electronic display includes multiple screens and at least one hinge disposed between the screens. The electronic display is configured to be folded at the at least one hinge by pivoting at least one of the screens about the at least one hinge to adjust a viewing angle of an occupant in the vehicle relative to the at least one screen. The adjustment mechanism is configured to maintain the at least one screen in any one of a plurality of positions when the electronic display is folded at the at least one hinge by pivoting the at least one screen about the at least one hinge to adjust the at least one screen to the one position.

21 Claims, 24 Drawing Sheets

(58) Field of Classification Search
CPC ...... B60K 2370/744; B60K 2370/1523; B60K 2370/182; B60K 2370/741
See application file for complete search history.

(56) References Cited

U.S. PATENT DOCUMENTS

| | | | |
|---|---|---|---|
| 2012/0070172 A1* | 3/2012 | Ota | G03G 15/2064 399/67 |
| 2017/0083047 A1* | 3/2017 | Hélot | H01L 27/323 |
| 2017/0217290 A1* | 8/2017 | Yoshizumi | G09F 21/049 |
| 2017/0313248 A1* | 11/2017 | Kothari | B60R 1/00 |
| 2018/0260001 A1* | 9/2018 | Klug | B60K 35/00 |
| 2018/0304749 A1* | 10/2018 | Cho | B60K 37/06 |
| 2018/0370363 A1* | 12/2018 | Vinogradov | B60K 37/04 |
| 2019/0196541 A1* | 6/2019 | O'Neil | G06F 1/1681 |
| 2020/0137905 A1* | 4/2020 | Redeker | B60K 35/00 |
| 2021/0023948 A1* | 1/2021 | Knittl | B60K 37/02 |
| 2021/0026416 A1* | 1/2021 | Magi | G06F 1/1601 |
| 2021/0089076 A1* | 3/2021 | Stegemann | G06F 1/1656 |
| 2021/0208640 A1* | 7/2021 | Li | G06F 1/1677 |
| 2021/0256881 A1* | 8/2021 | Yoon | G06F 1/1601 |
| 2021/0316611 A1* | 10/2021 | Zachar | B60K 35/00 |

FOREIGN PATENT DOCUMENTS

| | | |
|---|---|---|
| DE | 102016213688 A1 | 2/2018 |
| DE | 102015011377 B4 | 11/2019 |

* cited by examiner

VEHICLE ELECTRONIC DISPLAY CONFIGURED TO FLEX AND/OR FOLD FOR ENHANCED USABILITY AND VIEWING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle electronic displays configured to flex and/or fold for enhanced usability and viewing.

Modern vehicles typically includes an electronic display mounted on an instrument panel. The electronic display is used to display various types of media such as interactive media (e.g., climate controls, vehicle navigation, stereo controls) and video (e.g., movies, television shows, online videos). When the electronic display is used to display interactive media, the electronic display is typically a touchscreen allows a user to provide input (e.g., make selections) by touching certain locations on the touchscreen.

SUMMARY

An example of a display assembly for a vehicle according to the present disclosure includes an electronic display and an adjustment mechanism. The electronic display is configured to be mounted to an instrument panel of the vehicle. The electronic display includes multiple screens and at least one hinge disposed between the screens. The electronic display is configured to be folded at the at least one hinge by pivoting at least one of the screens about the at least one hinge to adjust a viewing angle of an occupant in the vehicle relative to the at least one screen. The adjustment mechanism is configured to maintain the at least one screen in any one of a plurality of positions when the electronic display is folded at the at least one hinge by pivoting the at least one screen about the at least one hinge to adjust the at least one screen to the one position.

In one example, the at least one hinge includes a plurality of hinges.

In one example, the screens include a first screen and a second screen, the at least one hinge includes a first hinge disposed between the first and second screens, the first screen is configured to be mounted to the instrument panel, and the second screen is configured to be pivoted about the first hinge to adjust the viewing angle of the occupant relative to the second screen.

In one example, the screens further include a third screen, the at least one hinge includes a second hinge disposed between the first and third screens, and the third screen is configured to be pivoted about the hinge to adjust the viewing angle of the occupant relative to the third screen.

In one example, the second screen is configured to be pivoted about the first hinge such that the second screen is angled toward a first occupant on a first side of the vehicle, and the third screen is configured to be pivoted about the second hinge such that the third screen is angled toward a second occupant on a second side of the vehicle opposite of the first side.

In one example, the adjustment mechanism includes a tube, a rod, and an electromagnet. The tube is configured to be mounted to an instrument panel and is configured to contain magnetorheological fluid. The rod has a first end attached to the at least one screen and a second end disposed within the tube. The electromagnet is disposed within the tube, attached to one of the tube and the rod, and configured to generate a magnetic field to adjust a viscosity of magnetorheological fluid contained within the tube.

In one example, the display assembly further includes a locking mechanism configured to hold the at least one screen in position when the at least one screen is pushed against the instrument panel a first time, and release the at least one screen when the at least one screen is pushed against the instrument panel a second time.

Another example of a display assembly for a vehicle according to the present disclosure includes an electronic display, at least one slide track, and at least one slider. The electronic display is configured to be flexed to adjust a viewing angle of an occupant in the vehicle relative to the electronic display. The at least one slide track is configured to be mounted to an instrument panel of the vehicle. The at least one slider is coupled to the electronic display and is configured to translate within the at least one slide track as the electronic display is flexed.

In one example, the at least one slider is slidably coupled to the electronic display, and the at least one slider is configured to translate along a length of the electronic display while translating within the at least one slide track as the electronic display is flexed.

In one example, the at least one slide track includes a plurality of slide tracks configured to be mounted to the instrument pane, and the at least one slider includes a plurality of sliders. Each slider in the plurality of sliders is configured to translate within one slide track in the plurality of slide tracks as the electronic display is flexed.

In one example, the electronic display includes a first screen, a second screen, and a first hinge disposed between the first and second screens. The first screen is configured to be folded about the first hinge and flexed to adjust the viewing angle of the occupant relative to the second screen. The at least one slide track includes a first slide track configured to be mounted to the instrument panel. The at least one slider includes a first slider coupled to the first screen and configured to translate within the first slide track when the first screen is flexed.

In one example, the second screen is configured to be folded about the first hinge and flexed to adjust the viewing angle of the occupant relative to the second screen, the at least one slide track includes a second slide track configured to be mounted to the instrument panel, and the at least one slider includes a second slider coupled to the second screen and configured to translate within the second slide track when the second screen is flexed.

In one example, the electronic display further includes a third screen and a second hinge disposed between the first and third screens, the at least one slide track includes a second slide track configured to be mounted to the instrument panel, the at least one slider includes a second slider coupled to the third screen and configured to translate within the second slide track when the third screen is flexed, and the third screen is configured to be folded about the second hinge and flexed to adjust the viewing angle of the occupant relative to the third screen.

In one example, the first screen is configured to have a flat profile when the second screen is flexed, and the second screen is configured to have a curved profile when the second screen is flexed.

An example of an infotainment system for a vehicle according to the present disclosure includes an electronic display, an actuator, and a display control module. The electronic display is configured to be at least one of flexed and folded to adjust a viewing angle of an occupant in the vehicle relative to the electronic display. The actuator is attached to the electronic display and is configured to be mounted to an instrument panel of the vehicle. The display control module is configured to control the actuator to at least one of flex and fold the electronic display into any one of a plurality of configurations.

In one example, the infotainment system further includes at least one sensor disposed within a cabin of the vehicle, and an occupant module configured to determine a location of the occupant based on an input from the at least one sensor. The display control module is configured control the actuator to adjust the configuration of the electronic display based on the occupant location.

In one example, the infotainment system further includes a media type module configured to determine a type of media being displayed by the electronic display. The display control module is configured control the actuator to adjust the configuration of the electronic display based on the media type.

In one example, the electronic display includes a first screen and a second screen. The display control module is configured control the actuator to adjust the first screen to a first configuration and to adjust the second screen to a second configuration that is different from the first configuration.

In one example, the first configuration yields a target viewing angle of the first screen for a first occupant located on a first side of the vehicle, and the second configuration yields a target viewing angle of the second screen for a second occupant located on a second side of the vehicle opposite of the first side.

In one example, the infotainment system further includes a first speaker, a second speaker, and a speaker control module. The first speaker is configured to be mounted within a cabin of the vehicle. The second speaker is configured to be mounted within the vehicle cabin. The speaker control module is configured to control the first speaker to generate audio corresponding to media being displayed on the first screen, and control the second speaker to generate audio corresponding to media being displayed on the second screen.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An electronic display according to the present disclosure can be folded and/or flexed into a number of different configurations to optimize the viewing experience of one or more users in a vehicle and/or to optimize the usability of the electronic display. In one example, the electronic display includes a hinge located midway along its length that enables pivoting the right half of the display toward the driver seat and pivoting the left half of the display toward the front passenger seat. In another example, the electronic display is flexible and is mounted to a top surface of an instrument panel using one or more sliding mechanisms that enable(s) flexing the electronic display into various shapes such as a flat shape and a curved shape.

The electronic display can be folded and/or flexed manually (e.g., by hand) or automatically. For manual adjustments, an adjustment mechanism containing magnetorheological fluid may be coupled to the electronic display to maintain the display in any one of an infinite number of positions to which the display may be adjusted. An electromagnet in the adjustment mechanism produces a magnetic field that may be adjusted to adjust the viscosity of the magnetorheological fluid, and thereby adjust the effort and precision associated with adjusting the configuration of the electronic display. For automatic adjustments, an actuator such as electric motor may be coupled to the electronic display, and a control module may control the position of the actuator to adjust the configuration of the display.

Regardless of whether the electronic display is manually or automatically folded and/or flexed, the settings of other systems of the vehicle may be automatically adjusted (or personalized) based on the current configuration of the display. Examples of other vehicle systems that may be automatically adjusted include an interior lighting system, an interior sound system, and an interior heating, venting, and air conditioning (HVAC) system. In one example, the electronic display is flexed into a curved shape that faces toward the front passenger seat and away from the driver seat, and the interior sound system only plays audio from speakers located in or near the front passenger seat.

Figure 1:
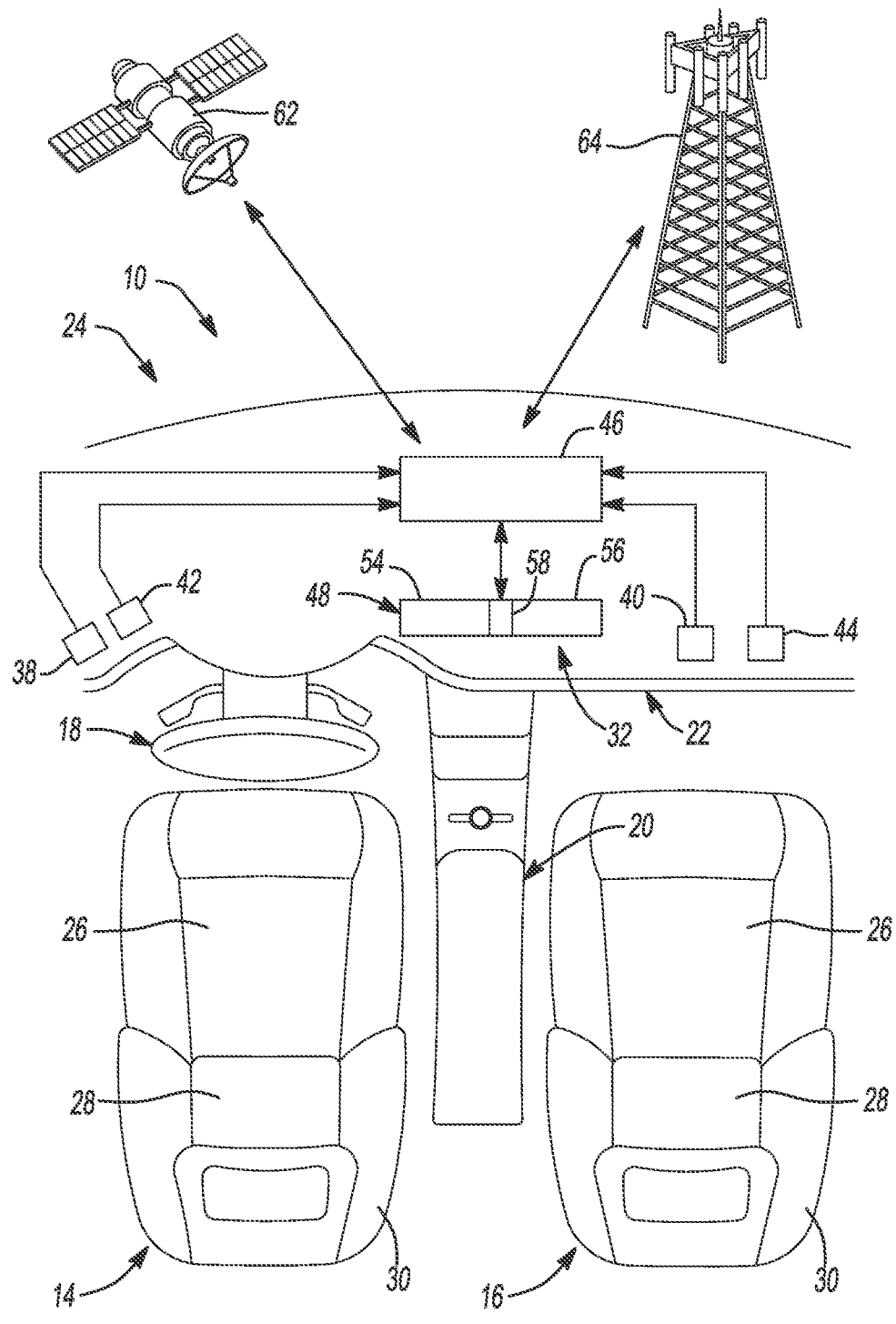
FIGS. 1 through 3 are plan views of a vehicle including a first example of a display assembly according to the principles of the present disclosure.
Figure 2:
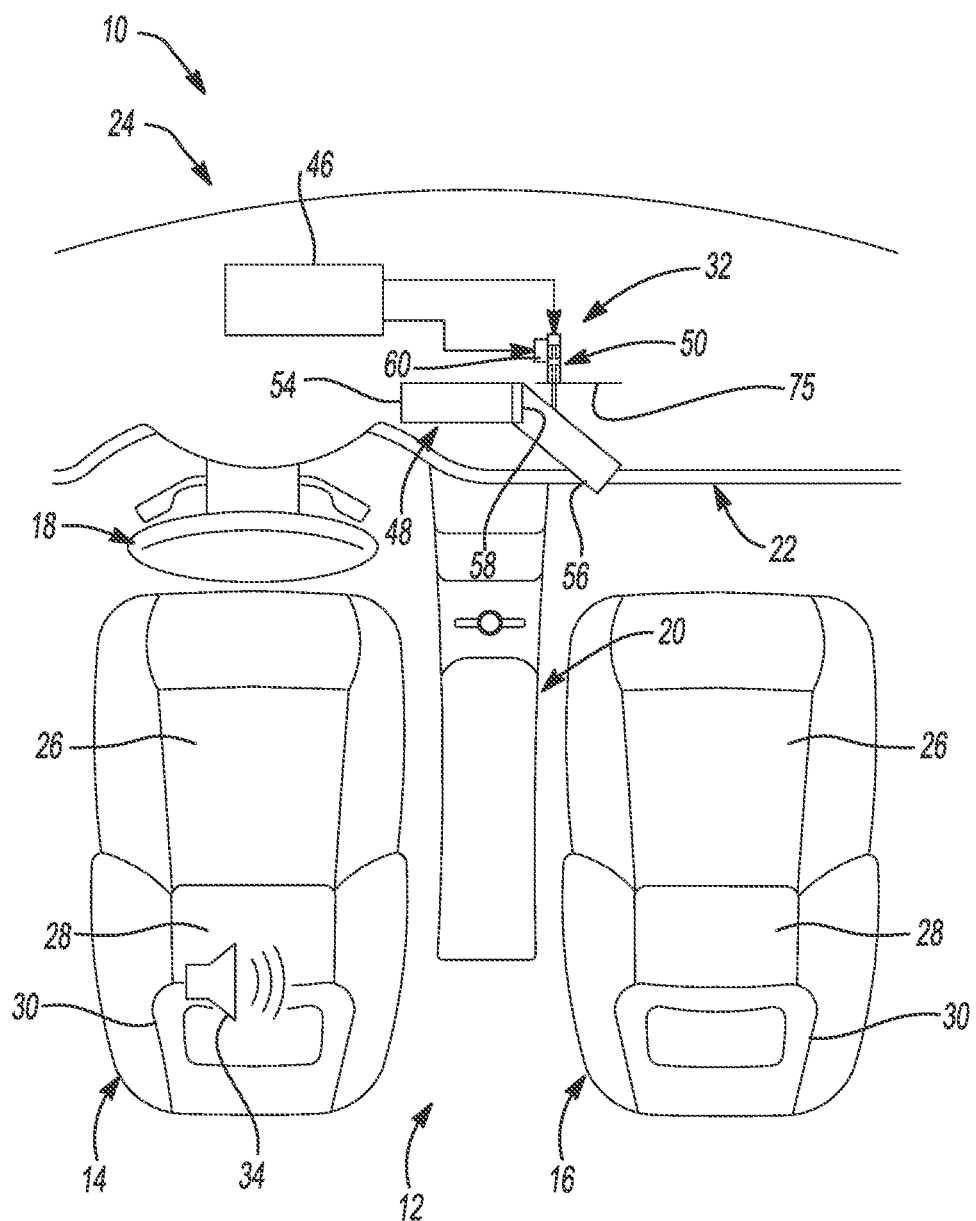
Figure 3:
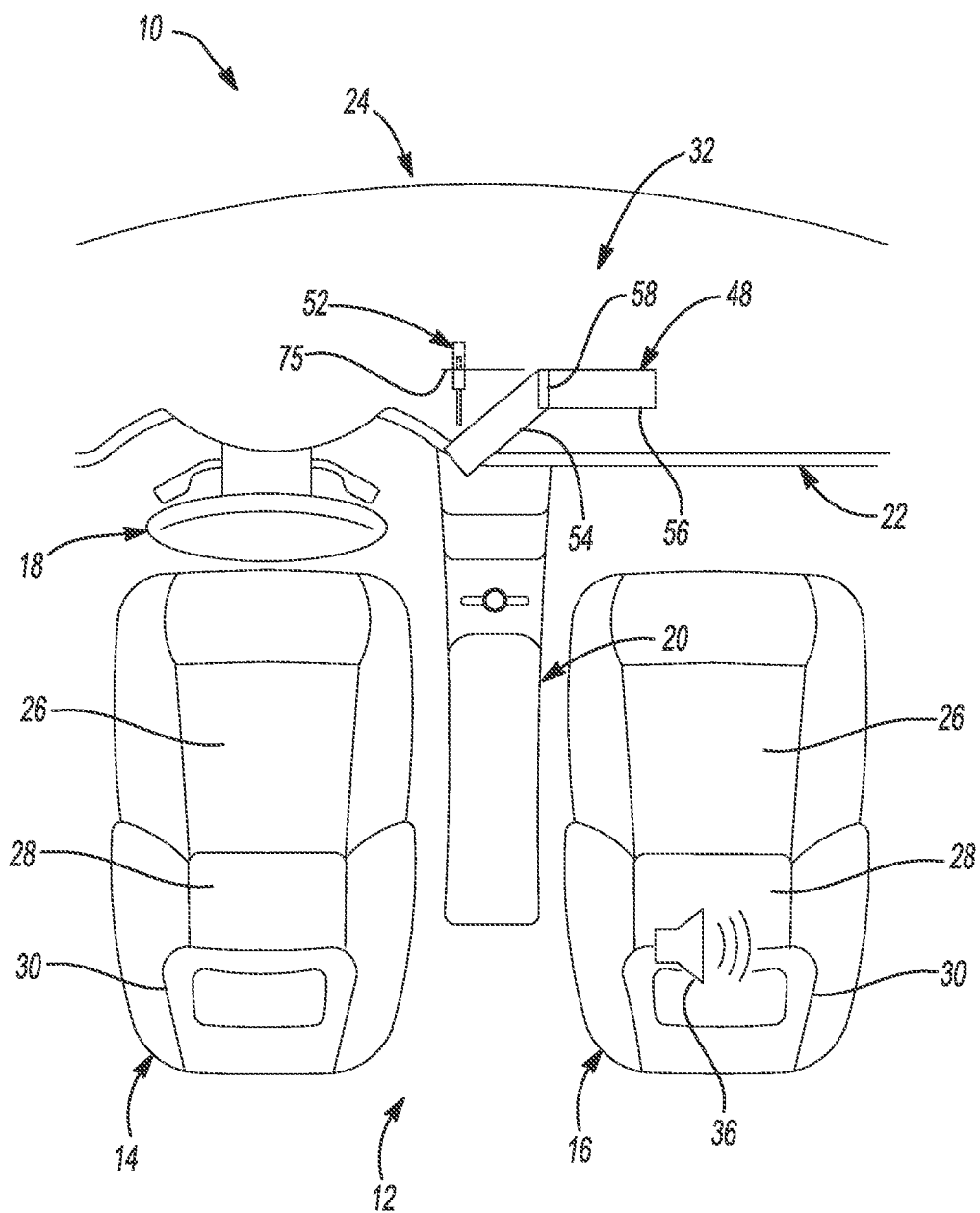

Referring now to FIGS. 1-3, a vehicle 10 includes a cabin 12, a first seat 14, a second seat 16, a steering wheel 18, a center console 20, an instrument panel 22, and an infotainment system 24. The first seat 14, the second seat 16, the steering wheel 18, the center console 20, the instrument panel 22, and the infotainment system 24 are disposed within the cabin 12. Each of the first and second seats 14 and 16 includes a seat bottom 26, a seatback 28, and a headrest 30.

The infotainment system 24 includes a display assembly 32, a first speaker 34, a second speaker 36, the first camera 38, a second camera 40, a first infrared sensor 42, a second infrared sensor 44, and a system control module 46. The display assembly 32 includes an electronic display 48, an adjustment mechanism 50, and locking mechanism 52. For illustration purposes, one or more components of the infotainment system 24 are not shown in each figure that shows the vehicle 10. However, it should be understood that the vehicle 10 may include all of the components of the infotainment system 24 described above in a single embodiment.

The first speaker 34 is mounted within the headrest 30 of the first seat 14. The second speaker 36 is mounted to or within the headrest 30 the second seat 16. The first camera 38, the second camera 40, the first infrared sensor 42, the second infrared sensor 44, and the electronic display 48 are mounted to the instrument panel 22.

The electronic display 48 includes a first screen 54, a second screen 56, and a hinge 58 disposed between the first and second screens 54 and 56. The system control module 46 may control the first and second screens 54 and 56 to display media. The system control module 46 may control the first screen 54 to display a first media and control the second screen 56 to display a second media that is different than the first media. For example, the system control module 46 may control the first screen 54 to display climate controls, and the system control module 46 may control the second screen 56 to display a movie. In another example, the system control module 46 may control the first screen 54 to display a first movie, and the system control module 46 may control the second screen 56 to display a second movie that is different than the first movie. Alternatively, the system control module 46 may control the first and second screens 54 and 56 to display different portions of the same media. For example, the system control module 46 may control the first screen 54 to display the left half of a movie, and system control module 46 may control the second screen 56 to display right half of the movie.

The system control module 46 may output a signal to the electronic display 48 indicating the media to be played by the first and second screens 54 and 56. Additionally or alternatively, the electronic display 48 may output a signal to the system control module 46 indicating the type(s) of media being displayed by the first screen 54 and/or the second screen 56. Examples of media types include interactive media (e.g., climate controls, vehicle navigation, stereo controls) and video (e.g., movies, television shows, online videos).

The electronic display 48 can be folded at the hinge 58 by pivoting one of the first and second screens 54 and 56 relative to (e.g., toward or away from) the instrument panel 22. Pivoting one of the first and second screens 54 and 56 in this manner adjusts a viewing angle of an occupant within the vehicle 10 relative to the one of the first and second screens 54 and 56 that is pivoted. The hinge 58 may be a living hinge (e.g., an area of the electronic display 48 having a reduced material thickness relative to the remainder of the electronic display 48). To this end, the electronic display 48 may be a single display mounted on a single substrate, the first and second screens 54 and 56 may be different sections of the substrate, and the hinge 58 may also be part of the substrate. Alternatively, the first and second screens 54 and 56 may be multiple separate displays that are attached together by the hinge 58, which may also be a separate component from the first and second screens 54 and 56. In this latter example, the first and second screens 54 and 56 can be folded about the hinge 58, or the first and second screens 54 and 56 can be unfolded to give the appearance of a single display.

In FIG. 1, neither one of the first or second screens 54 and 56 is pivoted away from the instrument panel 22 (e.g., the backsides of the first and second screens 54 and 56 are seated against the instrument panel 22). In this configuration, an occupant in the first seat 14 may have difficulty viewing the second screen 56, and an occupant in the second seat 16 may have difficulty viewing the first screen 54. In FIG. 2, the second screen 56 pivoted toward the first seat 14, which improves the viewing angle of an occupant in the first seat 14 relative to the second screen 56. In FIG. 3, the first screen 54 is pivoted toward the second seat 16, which improves the viewing angle of an occupant in the second seat 16 relative the first screen 54. The system control module 46 may adjust the electronic display 48 to one of the configurations shown in FIGS. 2 and 3 when controlling the first screen 54 to play one type of interactive media (e.g., vehicle navigation media) and controlling the first screen 54 to play another type of interactive media (e.g., stereo media).

While pivoting the first or second screen 54 or 56 toward an occupant in the first or second seat 14 or 16 improves the viewing angle of the occupant, it degrades the viewing angle of an occupant sitting in the other one of the first and second seats 14 and 16. This may be desirable to enable playing media that is not normally displayed within view of a driver when the vehicle is moving such as video or certain interactive media (e.g., destination entry, Bluetooth pairing). For example, when the first screen 54 is pivoted toward the second seat 16 as shown in FIG. 3, it may be difficult or impossible for a driver in the first seat 14 to view the first screen 54 and/or the second screen 56. Thus, the system control module 46 may control the first screen 54 and/or the second screen 56 to display video.

The system control module 46 may control one or both of the first or second screens 54 and 56 to display media, and the system control module 46 may control one or both of the first and second speakers 34 and 36 to play audio that corresponds to the media. When the second screen 56 is pivoted toward the first seat 14 as shown in FIG. 2, the system control module 46 may control only the first speaker 34 (not the second speaker 36) to play audio that corresponds to the media displayed by the first and second screens 54 and 56. When the first screen 54 is pivoted toward the second seat 16 as shown in FIG. 3, the system control module 46 may control only the second speaker 36 (not the first speaker 34) to play audio that corresponds to the media displayed by the first and second screens 54 and 56.

Either one of the first and second screens 54 and 56 can be pivoted to any one of a plurality of positions relative to the instrument panel 22. When one of the first and second screens 54 and 56 is pivoted to any one of the plurality of positions, the adjustment mechanism 50 maintains that one of the first and second screens 54 and 56 in the position to which that screen 54 or 56 is pivoted. In the example shown, the adjustment mechanism 50 connects the second screen 56 to the instrument panel 22, and therefore the adjustment mechanism 50 maintains the second screen 56 in the position to which the second screen 56 is pivoted.

In another example, the adjustment mechanism 50 may connect the first screen 54 to the instrument panel 22, and therefore the adjustment mechanism 50 may maintain the first screen 54 in the position to which the first screen 54 is pivoted. In another example, the display assembly 32 may include one adjustment mechanism 50 that connects the first screen 54 to the instrument panel 22 and another adjustment mechanism 50 that connects the second screen 56 to the instrument panel 22. In this other example, each adjustment mechanism 50 may maintain one of the first and second screens 54 and 56 in a position to which that one of the first and second screens 54 and 56 is pivoted.

When one of the first and second screens 54 and 56 is pivoted relative to the instrument panel 22, the adjustment mechanism 50 may produce a force that resists the pivoting motion of the one screen 54 or 56. This resistive force holds the one screen 54 or 56 in position when the one screen 54 or 56 is released after the one screen 54 or 56 is pivoted relative to the instrument panel 22. The amount of resistive force produced by the adjustment mechanism 50 may be adjustable.

The locking mechanism 52 may be a push-push locking mechanism or a push-release locking mechanism, such as those used to latch (stereo or kitchen) cabinet screens, which is operable to latch one of the first and second screens 54 and 56 when the one screen 54 or 56 is seated flat against the instrument panel 22. The locking mechanism 52 holds or locks one of the first and second screens 54 and 56 in position when the one screen 54 or 56 is pushed against the instrument panel 22 a first time. The locking mechanism 52 releases the one screen 54 or 56 when the one screen 54 or 56 is pushed against the instrument panel 22 a second time.

In the example shown in FIG. 3, the locking mechanism 52 is mounted to the instrument panel 22 and positioned to latch the first screen 54 when the first screen 54 is pushed against the instrument panel 22. In another example, the locking mechanism 52 may be mounted to the instrument panel 22 and positioned to latch the second screen 56 when the second screen 56 is pushed against the instrument panel 22. In another example, the display assembly 32 may include a pair of locking mechanisms 52 that are both mounted to the instrument panel 22, with one of the locking mechanisms 52 being positioned to latch the first screen 54 and the other one of the locking mechanisms 52 being positioned to latch the second screen 56.

The first and second screens 54 and 56 may be pivoted manually (e.g., by hand) or automatically. If the first and second screens 54 and 56 are pivoted automatically, the display assembly 32 may include an actuator 60 (e.g., electric motor) that is operable to pivot one of the first and second screens 54 and 56 relative to the instrument panel 22. The actuator 60 may be connected to or be incorporated in the adjustment mechanism 50.

In the example shown in FIG. 2, the adjustment mechanism 50 connects the first screen 54 to the instrument panel 22, the actuator 60 is connected to the adjustment mechanism 50, and the actuator 60 is operable to pivot the second screen 56 relative to the instrument panel 22. In another example, the adjustment mechanism 50 connects the first screen 54 to the instrument panel 22, the actuator 60 is connected to the adjustment mechanism 50, and the actuator 60 is operable to pivot the first screen 54 relative to the instrument panel 22. In another example, the display assembly 32 includes one actuator 60 that is operable to pivot the first screen 54 relative to the instrument panel 22, and another actuator 60 that is operable to pivot the second screen 56 relative to the instrument panel 22.

The system control module 46 may control the amount of resistive force produced by the adjustment mechanism 50. For example, the system control module 46 may output a signal to the adjustment mechanism 50 indicating a target resistive force to be produced by the adjustment mechanism 50. Additionally or alternatively, the system control module 46 may control the actuator 60 to pivot the first screen 54 and/or the second screen 56 relative to the instrument panel 22. For example, the system control module 46 may output a signal to the adjustment mechanism 50 indicating a target pivot position of the first or second screen 54 or 56.

The system control module 46 may control the adjustment mechanism 50 and/or the actuator 60 based on one or more inputs from the first camera 38, the second camera 40, the first infrared sensor 42, and the second infrared sensor 44. The first camera 38 captures an image of the interior of the vehicle 10 within view of the first camera 38 and outputs a signal to the system control module 46 indicating the image captured. The second camera 40 captures an image of the interior of the vehicle 10 within view of the second camera 40 and outputs a signal to the system control module 46 indicating the image captured. In the example shown, the first camera 38 is located on a first side of the vehicle 10 that includes the first seat 14, and the second camera 40 is located on a second side of the vehicle 10 that includes the second seat 16. In another example, the first and second cameras 38 and 40 may be replaced with a single camera that captures an image of the interior of the vehicle 10 on both the first and second sides of the vehicle 10.

The first infrared sensor 42 measures infrared light radiating from objects within view of the first infrared sensor 42 and outputs a signal indicating information about the objects. The second infrared sensor 44 measures infrared light radiating from objects within view of the second infrared sensor 44 and output signal indicating information about the objects. The signals output by the first and second infrared sensors 42 and 44 may indicate the size of the objects, the shapes of the objects, the type of the objects such as whether the objects are humans or inanimate objects, and/or the identity of the objects such as the identity of a particular human. In the example shown, the first infrared sensor 42 is located on the first side of the vehicle 10, and the second infrared sensor 44 is located on the second side of the vehicle 10. In another example, the first and second infrared sensors 42 and 44 may be replaced with a single camera that measures infrared light radiating from objects in the interior of the vehicle 10 on both the first and second sides of the vehicle 10.

The system control module 46 may control the adjustment mechanism 50 and/or the actuator 60 based on information received from a satellite 62 and/or a cell tower 64. The information may include the current time of day, the current day of the week, the current weather, the geographic location of the vehicle 10, and the route in which the vehicle 10 is following. The system control module 46 may communicate with the satellite 62 and/or the cell tower 64 via one or more wireless signals. In this regard, the system control module 46 may include a transceiver operable to (i) transmit wireless signals to the satellite 62 and/or the cell tower 64, and (ii) receive wireless signals from the satellite 62 and/or the cell tower 64.

Figure 4A:
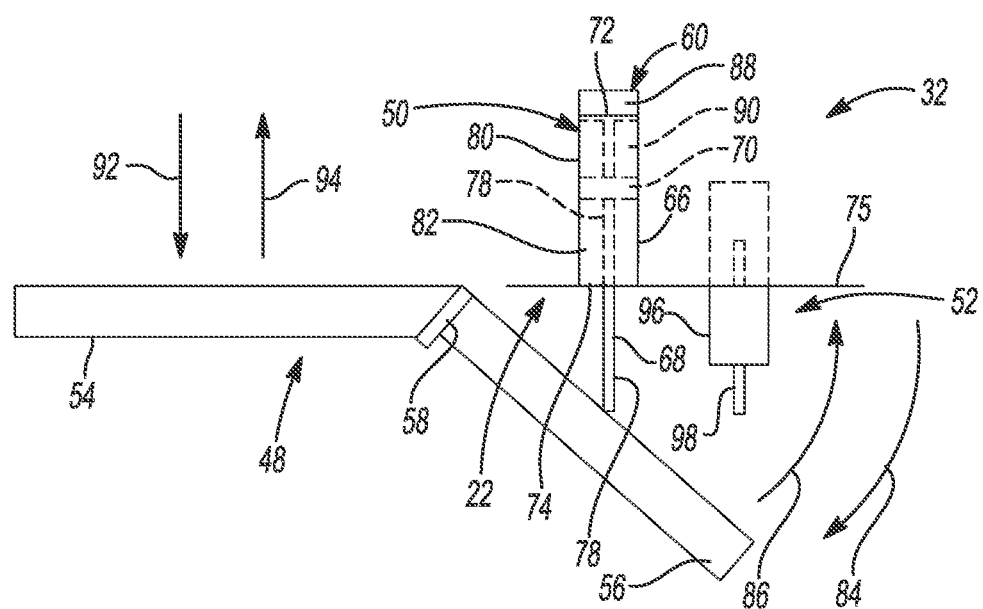
FIG. 4A is an enlarged plan view of the first example display assembly.
Figure 4B:
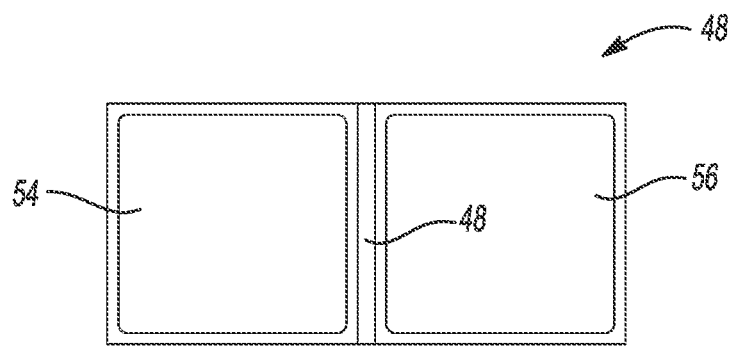
FIG. 4B is a front view of the first example display assembly.

Referring now to FIGS. 4A and 4B, an example implementation of the adjustment mechanism 50 includes a tube 66, a rod 68, and a piston 70. The tube 66 is mounted within the instrument panel 22 and contains magnetorheological fluid. The tube 66 has a first end 72 and a second end 74 opposite of the first end 72. The second end 74 of the tube 66 is attached to an exterior wall 75 of the instrument panel 22.

The rod 68 has a first end 76 and a second end 78 opposite of the first end 76. The first end 76 of the rod 68 is attached to the piston 70. The second end 78 of the rod 68 is attached to the second screen 56. The piston 70 divides the interior of the tube 66 into a first region 80 and a second region 82. The first region 80 is disposed between the first end 72 of the tube 66 and the piston 70. The second region 82 is disposed between the piston 70 and the second end 74 of the tube 66. The piston 70 may define one or more flow control orifices that regulate the flow of magnetorheological fluid between the first and second regions 80 and 82.

The piston 70 may include an electromagnet that is operable to generate a magnetic field to adjust the viscosity of magnetorheological fluid contained within the tube 66. Alternatively, the electromagnet may be a separate component from the piston 70, and the electromagnet may be attached to the piston 70 or to the first end 72 of the tube 66. In any of these examples, the electromagnet is disposed within the tube 66, and the system control module 46 may adjust the amount of power supplied to the electric magnet in order to adjust the viscosity of magnetorheological fluid contained within the tube 66.

When the second screen 56 is pivoted away from the instrument panel 22 in a first (e.g., clockwise) direction 84, the second screen 56 pulls the rod 68 out of the tube 66, and the piston 70 moves with the rod 68. The magnetorheological fluid resists movement of the piston 70 and thereby produces a resistive force that holds the second screen 56 in position when the force pivoting the second screen 56 in the first direction 84 is released. When the second screen 56 pivoted toward the instrument panel 22 in a second (e.g., counterclockwise) direction 86 opposite of the first direction 84, the second screen 56 pushes the rod 68 into the tube 66, and the piston 70 moves with the rod 68. The resistive force produced by the magnetorheological fluid holds the second screen 56 in position when the force pivoting the second screen 56 in the second direction 86 is released.

As discussed above, the adjustment mechanism 50 may connect the first screen 54 to the instrument panel 22 instead of the second screen 56, or the display assembly 32 may include two adjustment mechanisms 50 that each connect one of the first and second screens 54 and 56 to the instrument panel 22. In either example, the adjustment mechanism 50 connecting the first screen 54 to the instrument panel 22 is identical to the adjustment mechanism 50 shown in FIG. 4A except that second end 78 of the rod 68 is attached to the first screen 54.

The adjustment mechanism 50 enables finely adjusting the first or second screen 54 or 56 by hand and locking the first or second screen 54 or 56 at an infinite number of angles relative to the instrument panel 22 as desired by the user. The magnetorheological fluid contained within the tube 66 provides ease-of-use, precise movement, and a solid holding mechanism. Mechanical tracks and/or brackets may be included in, used with, or used in place of the adjustment mechanism 50.

The mechanical tracks and/or brackets may extend out of the instrument panel 22 when the first or second screen 54 or 56 is pivoted away from the instrument panel 22. The mechanical tracks and/or brackets may retract into the instrument panel 22 when the first or second screen 54 or 56 is pivoted toward the instrument panel 22. Alternatively, the mechanical tracks and/or brackets may be disposed outside of the instrument panel 22 when the first or second screen 54 or 56 is seated against the instrument panel 22, the mechanical tracks and/or brackets may extend and retract and a telescopic manner. In either example, the mechanical tracks and/or brackets may include detents that enable finite adjustment of the angle of the first or second screen 54 or 56 relative to the instrument panel 22.

As discussed above, the actuator 60 may be connected to the adjustment mechanism 50 and operable to pivot the second screen 56 toward or away from the instrument panel 22. In the example implementation of the actuator 60 shown in FIG. 4A, the actuator 60 includes an electric motor 88 and a rod 90. One end of the rod 90 is attached to the electric motor 88, and the other end of the rod 90 is attached to the piston 70. The electric motor 88 is operable to move the rod 90 in a third direction 92 or a fourth direction 94 opposite of the third direction 92. When the rod 90 moves in the third direction 92, the piston 70 and the rod 68 move with the rod 90, which causes the second screen 56 to pivot in the first direction 84. When the rod 90 moves in the fourth direction 94, the piston 70 and the rod 68 move with the rod 90, which causes the second screen 56 to pivot in the second direction 86. The system control module 46 may control the speed and/or rotational direction of the electric motor 88.

In various implementations, the actuator 60 may be omitted, and the first or second screen 54 or 56 may be pivoted relative to the instrument panel 22 by hand. In other implementations, the adjustment mechanism 50 may be omitted, and the actuator 60 may be connected directly to the first or second screen 54 or 56. For example, the electric motor 88 may be disposed within the instrument panel 22 and attached to the exterior wall 76 thereof, and the end of the rod 90 that is attached to the piston 70 in FIG. 4A may be attached to the second screen 56 instead.

The example implementation of the locking mechanism 52 shown in FIG. 4A includes a tube 96 and a rod 98. When the second screen 56 is pivoted away from the instrument panel 22 as shown in FIG. 4A, the tube 96 and the rod 98 may project outside of the instrument panel 22 as depicted by the solid line representation of the tube 96 and the rod 98 in FIG. 4A. When the second screen 56 is seated against the instrument panel 22, the tube 96 and the rod 98 may be disposed within of the instrument panel 22 as depicted by the phantom line representation of the tube 96 and the rod 98 in FIG. 4A.

The tube 96 contains the rod 98 when the tube 96 and the rod 98 are retracted into the instrument panel 22. The rod 98 may include a permanent magnet, and the second screen 56 may be made of a ferromagnetic material. The permanent magnet maintains the second screen 56 in contact with the rod 98 after the second screen 56 initially contacts the rod 98.

Each of the tube 96 and the rod 98 may be spring-loaded to bias the tube 96 and the rod 98 in the third direction 92 and thereby cause the second screen 56 to open to a predetermined angle relative to the instrument panel 22. For example, the locking mechanism 52 may include a first spring that biases the tube 96 and the direction 92, and a second spring that biases the rod 98 in the third direction 92. After the second screen 56 is opened to the predetermined angle, the second screen 56 may be toward the instrument panel 22 to return the second screen 56 to a locked state in which the second screen 56 is seated flat against the instrument panel 22.

Figure 5:
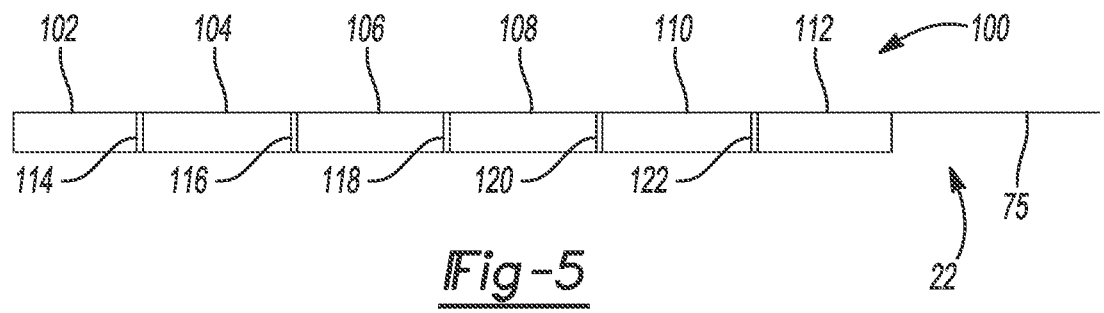
FIGS. 5 through 7 are plan views of a second example of a display assembly according to the principles of the present disclosure.
Figure 6:
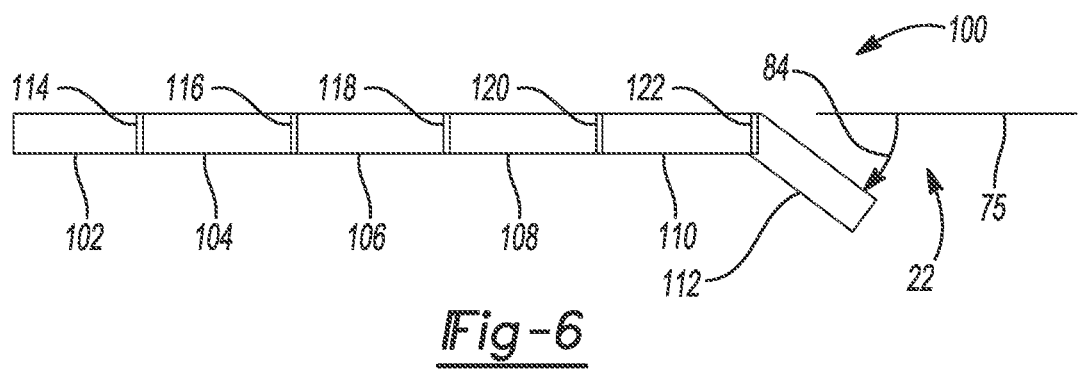
Figure 7:
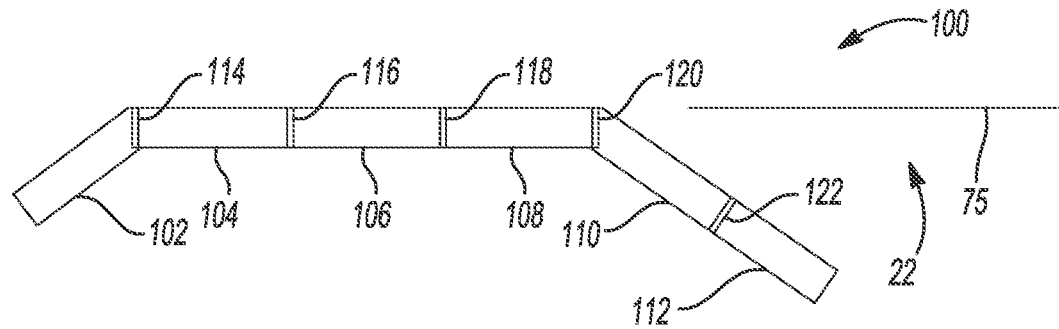

The display assembly 32 of FIGS. 1-3 and 4A may include an electronic display 100 shown in FIGS. 5-7 in place of the electronic display 48. The electronic display 100 includes a plurality of fold points or hinges, which enable arranging the electronic display 100 in a variety of shapes. The electronic display 100 includes a first screen 102, a second screen 104, a third screen 106, a fourth screen 108, a fifth screen 110, and a sixth screen 112. The electronic display 100 further includes a first hinge 114, a second hinge 116, a third hinge 118, a fourth hinge 120, and a fifth hinge 122. The first hinge 114 is disposed between the first and second screens 102 and 104. The second hinge 116 is disposed between the second and third screens 104 and 106. The third hinge 118 is disposed between the third and fourth screens 106 and 108. The fourth hinge 120 is disposed between the fourth and fifth screens 108 and 110. The fifth hinge 122 is disposed between the fifth and sixth screens 110 and 112.

The electronic display 100 can be folded at any one of the hinges 114-122 by pivoting one or more of the screens 102-112 relative to the instrument panel 22. Pivoting one or more of the screens 102-112 in this manner adjusts a viewing angle of an occupant within the vehicle 10 relative to the one(s) of the screens 102-112 that is/are pivoted. Each of the hinges 114-122 may be a living hinge (e.g., an area of the electronic display 100 having a reduced material thickness relative to the remainder of the electronic display 100). To this end, the electronic display 100 may be a single display mounted on a single substrate, the screens 102-112 may be different sections of the substrate, and the hinges 114-122 may also be part of the substrate. Alternatively, the screens 102-112 may be multiple separate displays that are attached together by the hinges 114-122, which may also be separate components from the screens 102-112. In this latter example, the screens 102-112 can be folded about the hinges 114-122, or the screens 102-112 can be unfolded to give the appearance of a single display.

In FIG. 5, all of the screens 102-112 are seated flat against the instrument panel 22. In FIG. 6, the sixth screen 112 is pivoted about the fifth hinge 122 in the first direction 84 away from the instrument panel 22 and toward the first seat 14 of FIG. 1. Pivoting the sixth screen 112 to the position shown in FIG. 6 improves the viewing angle of an occupant in the first seat 14 relative to the sixth screen 112.

In FIG. 7, the first screen 102 is pivoted about the first hinge 114 in the second direction 86 away from the instrument panel 22 and toward the second seat 16 of FIG. 1. In addition, the fifth and sixth screens 110 and 112 are pivoted about the fourth hinge 120 in the first direction 84 away from the instrument panel 22 and toward the first seat 14 of FIG. 1. Pivoting the first screen 102 to the position shown in FIG. 7 improves the viewing angle of an occupant in the second seat 16 relative to the first screen 102. Pivoting the fifth and sixth screens 110 and 112 to the positions shown in FIG. 7 improves the viewing angle of an occupant in the first seat 14 relative to the fifth and sixth screens 110 and 112. In implementations such as that shown in FIG. 7 where multiple ones of the screens 102-112 are pivotable together relative to the instrument panel 22, the hinge(s) disposed between those of the screens 102-112 may be omitted. For example, if the fifth and sixth screens 110 and 112 are pivotable together as shown in FIG. 7, the fifth hinge 122 may be omitted.

In various implementations, one or more of the screens 102-112 may be rigidly mounted to the instrument panel 22, and therefore may not be pivotable relative to the instrument panel 22. For example, the third and fourth screens 106 and 108 may be rigidly mounted to the instrument panel 22. In these implementations, one or more of the hinges 114-122 that are disposed between the one(s) of the screens 102-112 that are rigidly mounted to the instrument panel 22 may be omitted. For example, if the third and fourth screens 106 and 108 are rigidly mounted to the instrument panel 22, the third hinge 118 may be omitted.

Although not shown in FIGS. 5-7, the adjustment mechanism 50, the locking mechanism 52, and/or the actuator 60 may be used in conjunction with the electronic display 100. In addition, the system control module 46 may control the adjustment mechanism 50 to adjust the amount of force required to pivot one or more of the screens 102-112 relative to one or more other ones of the screens 102-112. Further, the system control module 46 may control the actuator 60 to pivot one or more of the screens 102-112 relative to one or more other ones of the screens 102-112.

Figure 8:
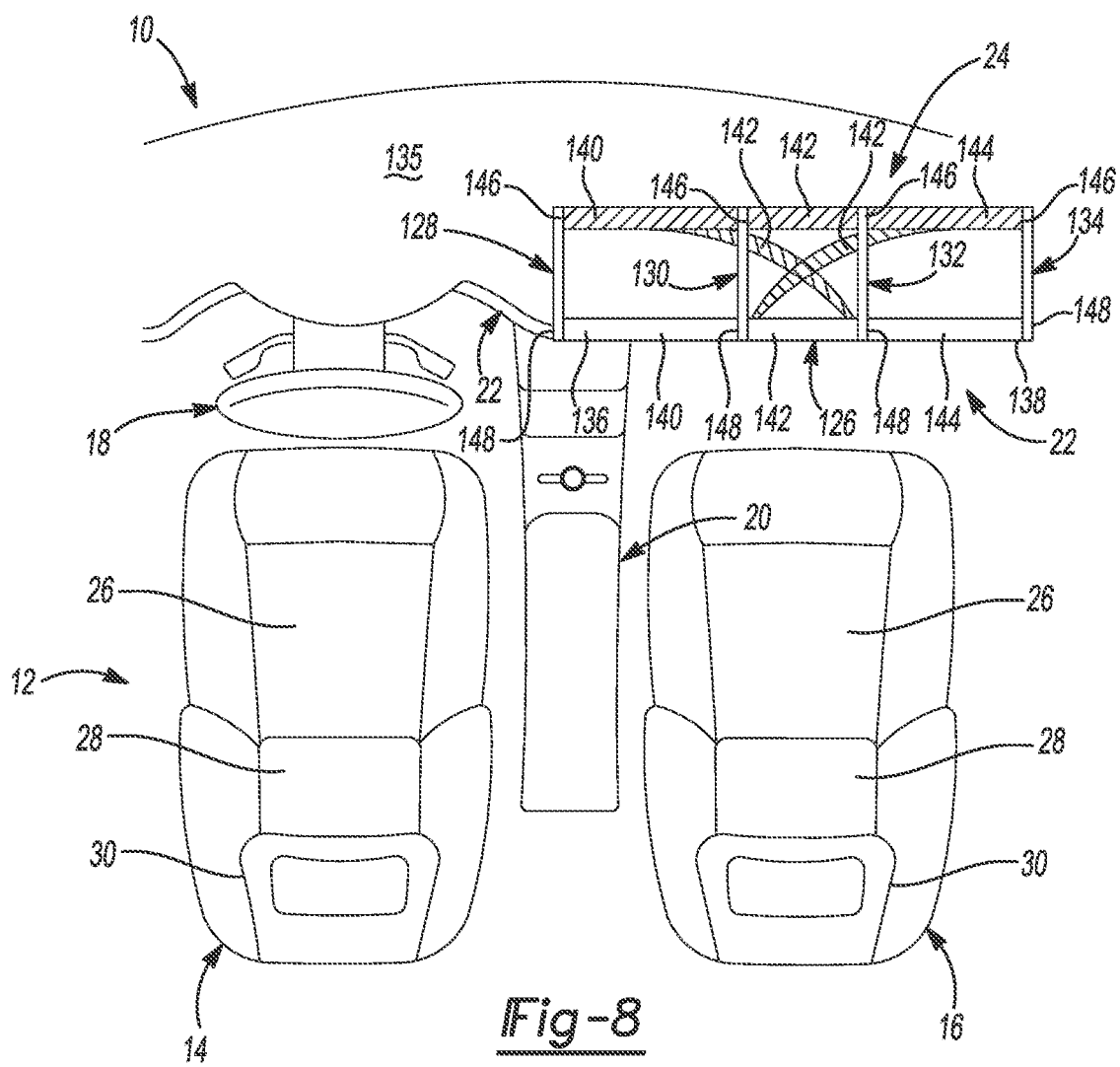
FIG. 8 is a plan view of the vehicle including a third example of a display assembly according to the principles of the present disclosure.

Referring now to FIG. 8, the vehicle 10 is shown with a display assembly 124 in place of the display assembly 32. The display assembly 124 includes an electronic display 126, a first slider mechanism 128, a second slider mechanism 130, a third slider mechanism 132, and a fourth slider mechanism 134. The electronic display 126 can be flexed to adjust a viewing angle of an occupant of the vehicle 10 relative to the electronic display 126. The electronic display 126 may be a flexible electronic paper display or a flexible organic light-emitting diode (OLED) display.

The slider mechanisms 128-134 connect the electronic display 126 to the instrument panel 22 in a manner that allows the electronic display 126 to be flexed relative to the instrument panel 22. The slider mechanisms 128-134 are mounted to or integrated into the instrument panel 22. In one example, the slider mechanisms 128-134 are mounted to a top surface 135 the instrument panel 22.

In addition, the electronic display 126 may include a hinge (e.g., a living hinge) at each location where the electronic display 126 is coupled to one of the slider mechanisms 128-134. The hinge(s) reduce stress in the electronic display 126 at locations where the electronic display 126 is folded, such as locations where the electronic display 126 transitions between a flat profile and a curved profile. The electronic display 126 may be a single display mounted on a single substrate, the single display may be folded about the hinge(s) to form multiple screens comprising different sections of the substrate, and the hinge(s) may also be part of the substrate. Alternatively, the screens formed by the electronic display 126 may be multiple separate displays that are attached together by the hinge(s), which may be separate from the screens. In this latter example, the screens formed by the electronic display 126 can be folded about the hinge(s), or the screens formed by the electronic display 126 can be unfolded to give the appearance of a single display.

The electronic display 126 has a first end 136, a second end 138 opposite of the first end 136, and a length that extends between the first and second ends 136 and 138. The electronic display 126 includes a first segment 140 disposed between the first and second slider mechanisms 128 and 130, a second segment 142 disposed between the second and third slider mechanisms 130 and 132, and a third segment 144 disposed between the third and fourth slider mechanism 132 and 134. Each of the slider mechanisms 128-134 has a first end 146, a second end 148 opposite of the first end 140, and a length that extends between the first and second ends 146 and 148.

FIG. 8 depicts four different configurations into which the electronic display 126 can be flexed. In the first configuration, the entire electronic display 126 has a flat profile that extends across the first ends 146 of the slider mechanisms 128-134. In the second configuration, the first segment 140 has a substantially flat profile extending between the first ends 146 of the slider mechanisms 128, 130, the second segment 142 has a curved profile extending substantially between the first end 146 of the slider mechanism 130 and the second end 148 of the slider mechanism 132, and the third segment 144 has a flat profile extending between the first ends 146 of the slider mechanisms 132, 134. In the third configuration, the first segment 140 has a flat profile extending between the second ends 148 of the slider mechanisms 128, 130, the second segment 142 has a curved profile extending substantially between the second end 148 of the slider mechanism 130 and the first end 146 of the slider mechanism 132, and the third segment 144 has a substantially flat profile extending between the first ends 146 of the slider mechanisms 132, 134. In the fourth configuration, the entire electronic display 126 has a flat profile that extends across the second ends 148 of the slider mechanisms 128-134.

To adjust the electronic display 126 from the first configuration to the second configuration, the electronic display 126 is translated along the entire length of each of the slider mechanisms 132, 134 from the first ends 146 thereof to the second ends 148 thereof, and the electronic display 126 is translated along a portion of the length of the slider mechanism 130 from the first end 146 thereof to a location near that first end 146. To adjust the electronic display 126 from the first configuration to the third configuration, the electronic display 126 is translated along the entire length of each of the slider mechanisms 128, 130 from the first ends 146 thereof to the second ends 148 thereof, and the electronic display 126 is translated along a portion of the length of the slider mechanism 132 from the first end 146 thereof to a location near that first end 146. To adjust the electronic display 126 from the first configuration to the fourth configuration, the electronic display 126 is translated along the entire length of each of the slider mechanisms 128-134 from the first ends 146 thereof to the second ends 148 thereof.

Figure 9:
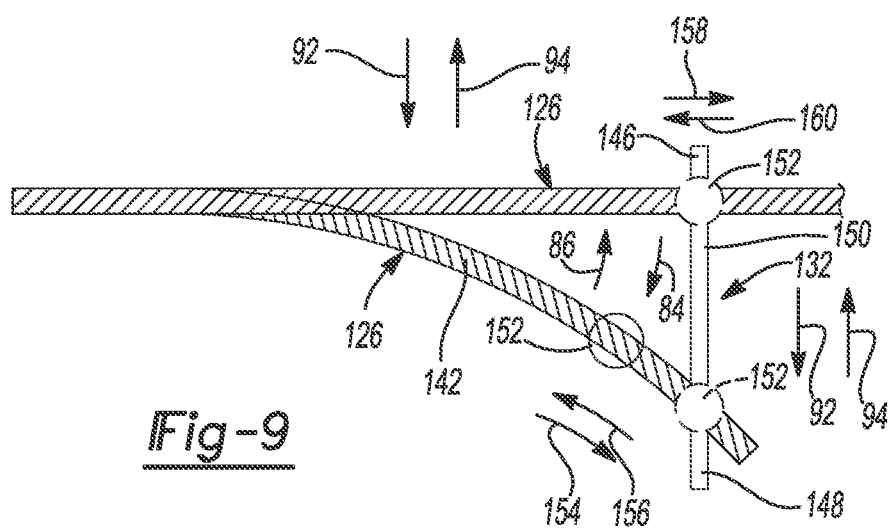
FIG. 9 is an enlarged plan view of a slider mechanism included in the third example display assembly.

Referring now to FIG. 9, an example implementation of the slider mechanism 132 includes a slide track 150 and a slider 152. The slide track 150 is mounted to the instrument panel 22, for example, to the top surface 135 (FIG. 8) thereof. The slider 152 has one end slidably coupled to the electronic display 126 and another end slidably coupled to the slide track 150. The slider 152 translates along the length of each of the electronic display 126 and the slide track 150 when the electronic display 126 is flexed at or near the slider mechanism 132. Each of the slider mechanisms 128, 130, and 134 may be similar or identical to the example implementation of the slider mechanism 132 shown in FIG. 9.

FIG. 9 shows the electronic display 126 in the first configuration and in (or nearly in) the second configuration. When the electronic display 126 is in the first configuration, the slider 152 (represented using a phantom line with no fill) is disposed at the first end 146 of the slider mechanism 132. When the electronic display 126 is in (or nearly in) the second configuration, the slider 152 (represented using a solid line with solid fill) is disposed at or near the second end 148 of the slider mechanism 132. When the electronic display 126 is flexed in the first direction 84 from the first configuration to (or nearly to) the second configuration, the slider 152 translates along the slide track 150 in the third direction 92 and translates along the electronic display 126 in a fifth direction 154.

When the electronic display 126 is flexed in the second direction 86 from the second configuration to the first configuration, the slider 152 translates along the slide track 150 in the fourth direction 94 and translates along the electronic display 126 in a sixth direction 156 opposite of the fifth direction 154. The representation of the slider 152 using a solid line with no fill indicates one location of the slider 152 when the slider 152 is translating along the length the electronic display 126 as the electronic display 126 is flexed. The translational movement of the slider 152 along the length of the electronic display 126 enables flexing the electronic display 126.

Since the slider 152 is slidably coupled to the electronic display 126, the slider 152 may translate in a seventh direction 158, or in an eighth direction 160 opposite of the seventh direction 158, relative to the electronic display 126. Additionally or alternatively, the slide track 150 may be mounted to the instrument panel 22 in a manner that allows the slide track 150 translate in the seventh or eighth directions 158 or 160 relative to the instrument panel 22. This additional degree of freedom may facilitate additional flexure of the electronic display 126.

Figure 10:
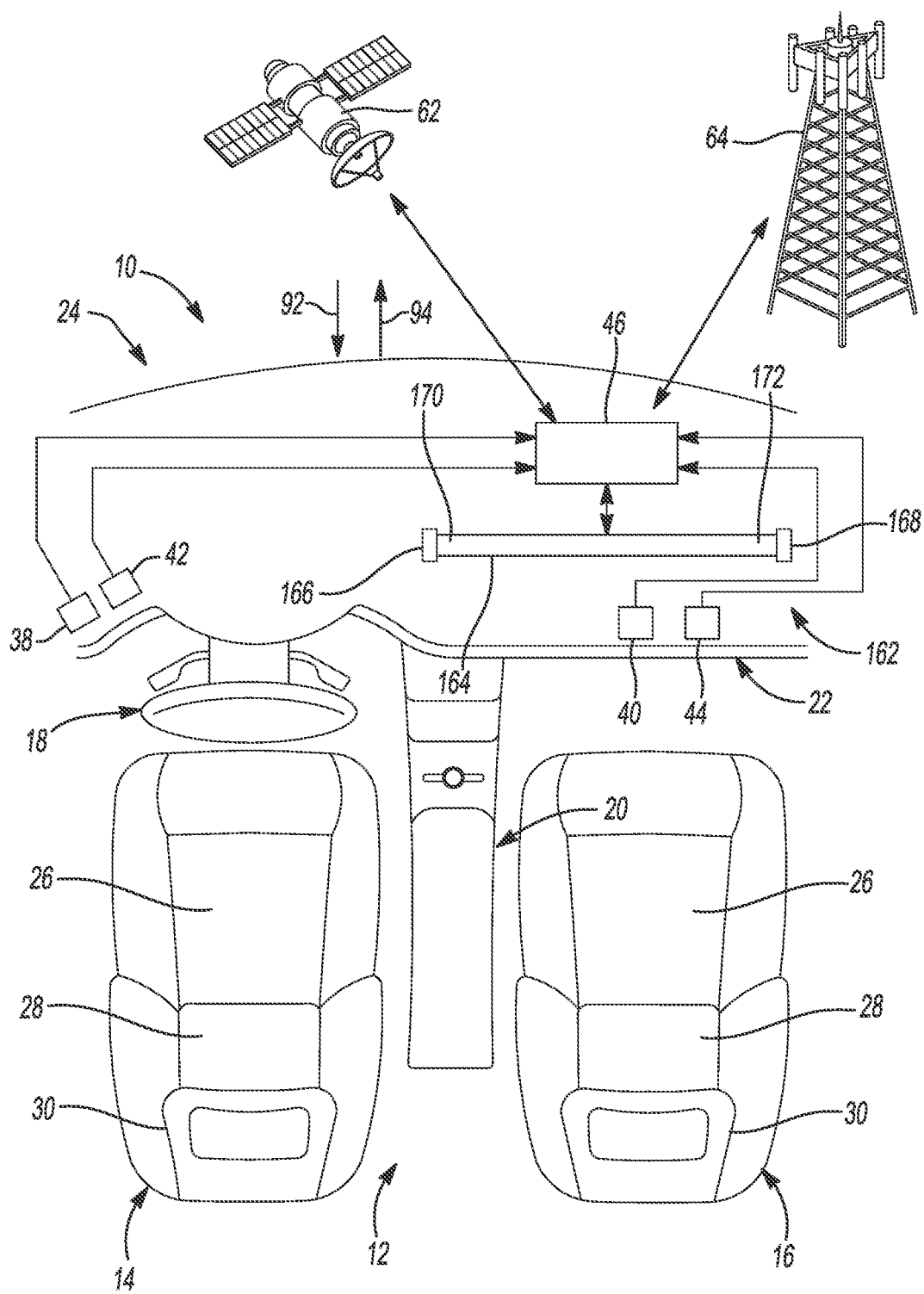
FIGS. 10 through 12 are plan views of the vehicle including a fourth example of a display assembly according to the principles of the present disclosure.
Figure 11:
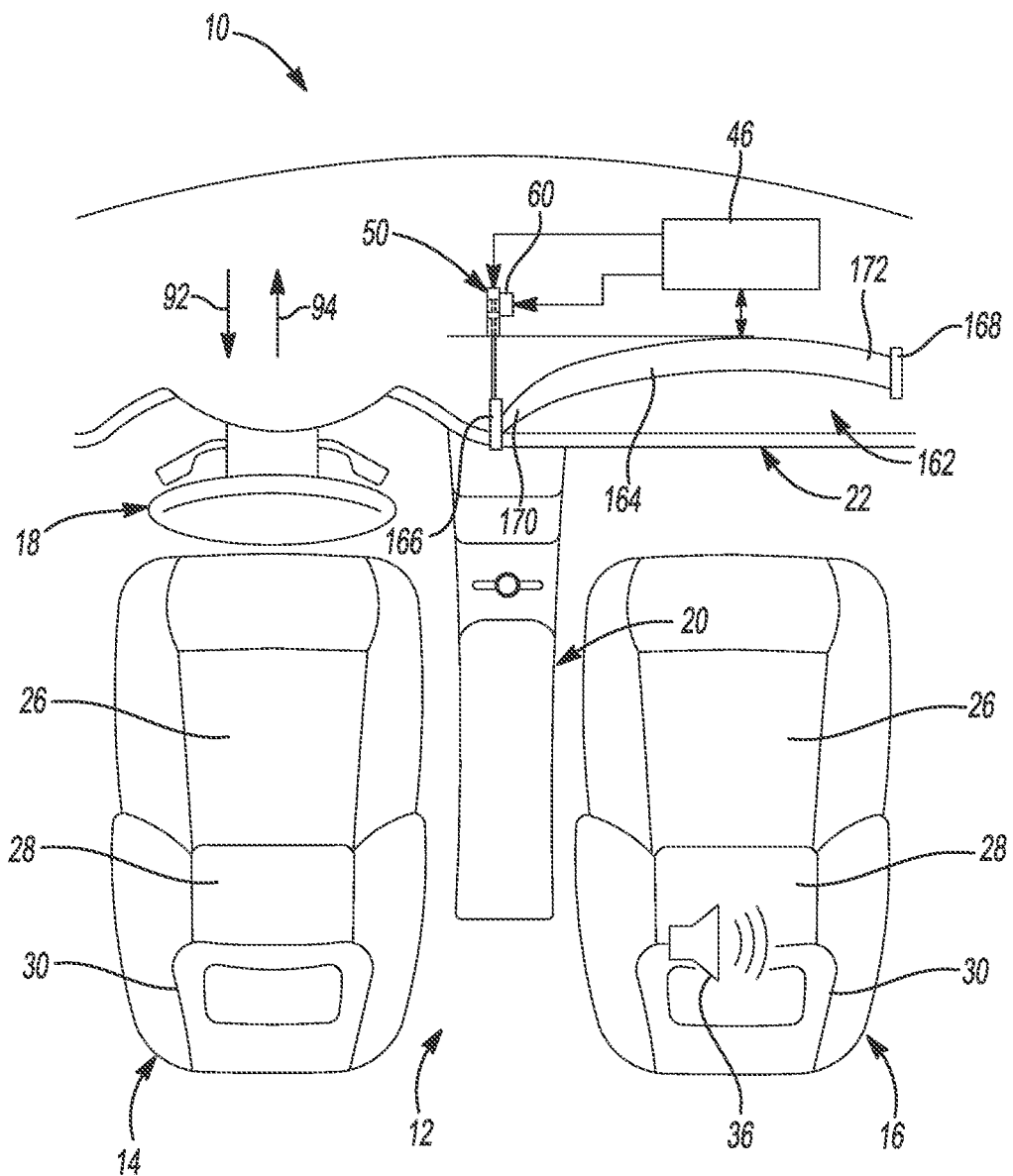
Figure 12:
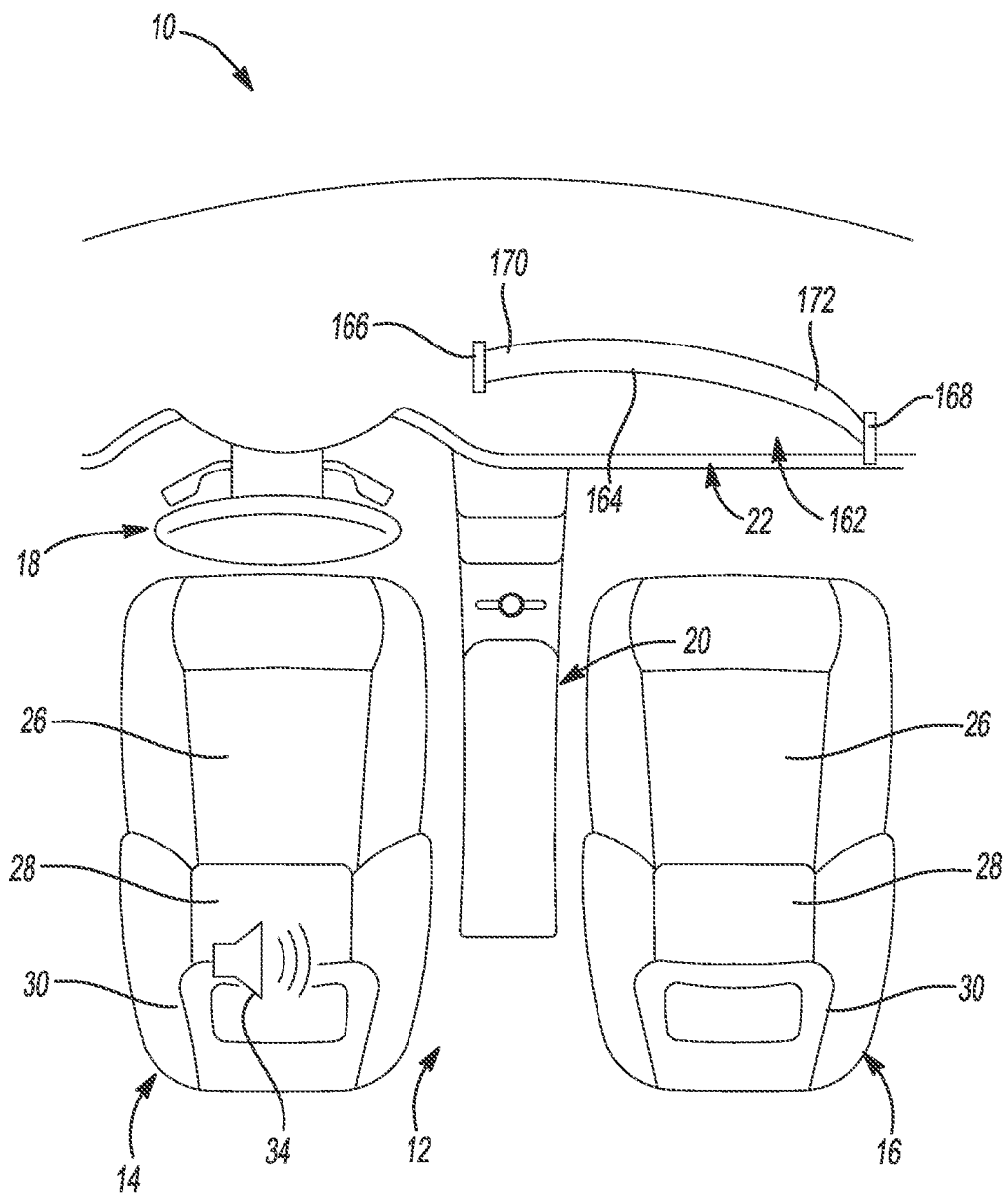

Referring now to FIGS. 10-12, the vehicle 10 is shown with a display assembly 162 in place of the display assembly 32. The display assembly 162 is similar to the display assembly 124 of FIG. 8 except that the display assembly 162 has fewer slider mechanisms than the display assembly 124. The display assembly 162 includes an electronic display 164, a first slider mechanism 166, and a second slider mechanism 168. The electronic display 164 can be flexed to adjust a viewing angle of an occupant of the vehicle 10 relative to the electronic display 164. The electronic display 164 may be a flexible electronic paper display or a flexible OLED display. Each of the first and second slider mechanisms 166 and 168 may be similar or identical to the slider mechanism 132 of FIG. 9.

The electronic display 164 has a first end 170, a second end 172 opposite of the first end 170, and a length extending between the first and second ends 170 and 172. When the electronic display 164 is flexed, the first end 170 of the electronic display 164 may translate along the first slider mechanism 166 in the third or fourth direction 92 or 94 to any one of a plurality of positions. Additionally or alternatively, when the electronic display 164 is flexed, the second end 172 of the electronic display 164 may translate along the second slider mechanism 168 in the third or fourth direction 92 or 94 to any one of a plurality of positions.

When the electronic display 164 is flexed into any one of a plurality of configurations, the adjustment mechanism 50 maintains the electronic display 164 in the configuration to which the electronic display 164 is flexed. When the electronic display 126 is flexed, the adjustment mechanism 50 may produce a force that resists the flexing motion of the electronic display 126. This resistive force holds the electronic display 164 in position when the electronic display 126 is released after the electronic display 126 is flexed. The system control module 46 may adjust the amount of resistive force produced by the adjustment mechanism 50 as discussed above.

In one example, when one of the first and second ends 170 and 172 of the electronic display 164 is translated along the second slider mechanism 168 in the third or fourth direction 92 or 94 to any one of a plurality of positions, the adjustment mechanism 50 maintains that one of the first and second ends 170 and 172 in the position to which that end 170 or 172 is translated. In the example shown, the adjustment mechanism 50 is attached to the first end 170 of the electronic display 164, and therefore the adjustment mechanism 50 maintains the first end 170 in the position to which the first end 170 is translated.

In another example, the adjustment mechanism 50 may be attached to the second end 172 of the electronic display 164, and therefore the adjustment mechanism 50 may maintain the second end 172 in the position to which the second end 172 is translated. In another example, the display assembly 32 may include one adjustment mechanism 50 that is attached to the first end 170 of the electronic display 164 and another adjustment mechanism 50 that is attached to the second end 172 of the electronic display 164. In this other example, each adjustment mechanism 50 may maintain one of the first and second ends 170 and 172 of the electronic display 164 in a position to which that one of the first and second ends 170 and 172 is translated.

In various implementations, the adjustment mechanism 50 may be attached to the electronic display 164 and a location between the first and second ends 166 and 168. In other implementations, the adjustment mechanism 50 may be attached to a slider in one of the slider mechanisms 166, 168, such as the slider 152 of FIG. 9, instead of being attached directly to the electronic display 164. Thus, the location at which the adjustment mechanism 50 is indirectly attached to the electronic display 164 may vary as the slider translates along the length of the electronic display 164.

In FIG. 10, the electronic display 164 is shown in its relaxed state with a flat profile. In FIG. 11, the electronic display 164 is flexed by translating the first end 170 of the electronic display 164 in the third direction 92 relative to its position shown in FIG. 10 while the second end 172 of the electronic display 164 remains in the position shown in FIG. 10. In FIG. 12, the electronic display 164 is flexed by translating the second end 172 of the electronic display 164 in the third direction 92 relative to its position shown in FIG. 10 while the first and 170 of the electronic display 164 remains in the position shown in FIG. 10.

Flexing the electronic display 164 to the configuration shown in FIG. 11 improves the viewing angle of an occupant in the second seat 16 relative to the electronic display 164. In addition, flexing the electronic display 164 to the configuration shown in FIG. 11 degrades the viewing angle of a driver in the first seat 14 relative to the electronic display 164. Therefore, the system control module 46 may control the electronic display 164 to display media such as video.

Flexing the electronic display 164 to the configuration shown in FIG. 12 improves the viewing angle of an occupant in the first seat 14 relative to the electronic display 164.

The electronic display 164 may be flexed manually or automatically. In the latter case, the actuator 60 may be connected to or be incorporated in the adjustment mechanism 50 as discussed above and shown in FIG. 11. Alternatively, the actuator 60 may be directly attached to the electronic display 164 or to a slider in one of the slider mechanisms 166, 168, such as the slider 152 of FIG. 9. In this latter example, the adjustment mechanism 50 may be omitted.

The system control module 46 may control the adjustment mechanism 50 to adjust the amount of resistive force produced by the adjustment mechanism 50 as the electronic display 164 is flexed. The system control module 46 may control the actuator 60 to flex the electronic display 164 into any one of a plurality of configurations. As discussed above, the system control module 46 may control the adjustment mechanism 50 and/or the actuator 60 based on one or more inputs from the first camera 38, the second camera 40, the first infrared sensor 42, the second infrared sensor 44, the satellite 62, and the cell tower 64.

The system control module 46 may control the electronic display 164 to display media, and the system control module 46 may control one or both of the first and second speakers 34 and 36 to play audio that corresponds to the media. When the electronic display 164 is flexed toward the second seat 16 as shown in FIG. 11, the system control module 46 may control only the second speaker 36 to play audio that corresponds to the media displayed by the electronic display 164. When the electronic display 164 is flexed toward the first seat 14 as shown in FIG. 12, the system control module 46 may control only the first speaker 34 to play audio that corresponds to the media displayed by the electronic display 164.

Figure 13:
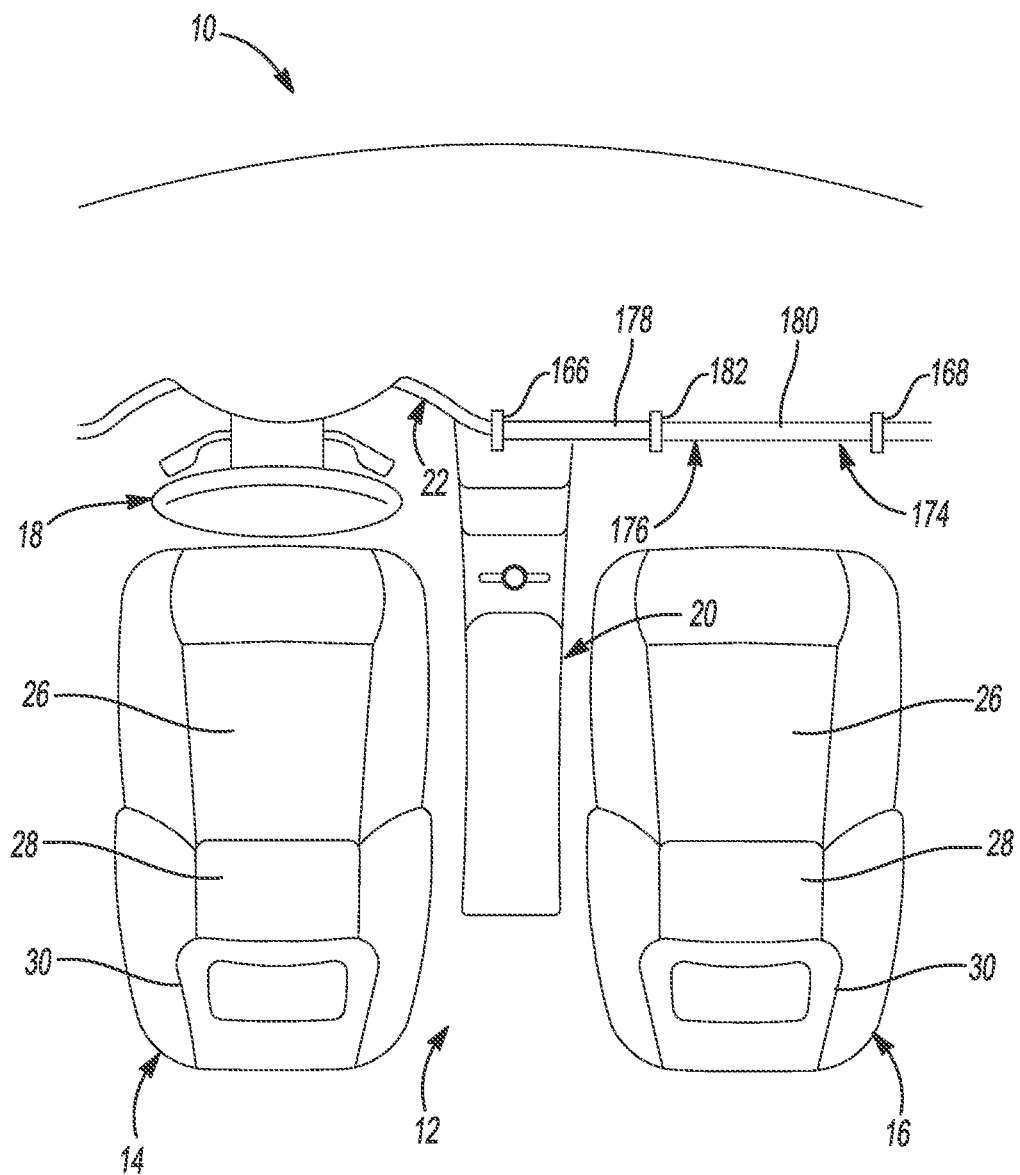
FIGS. 13 through 15 are plan views of the vehicle including a fifth example of a display assembly according to the principles of the present disclosure.
Figure 14:
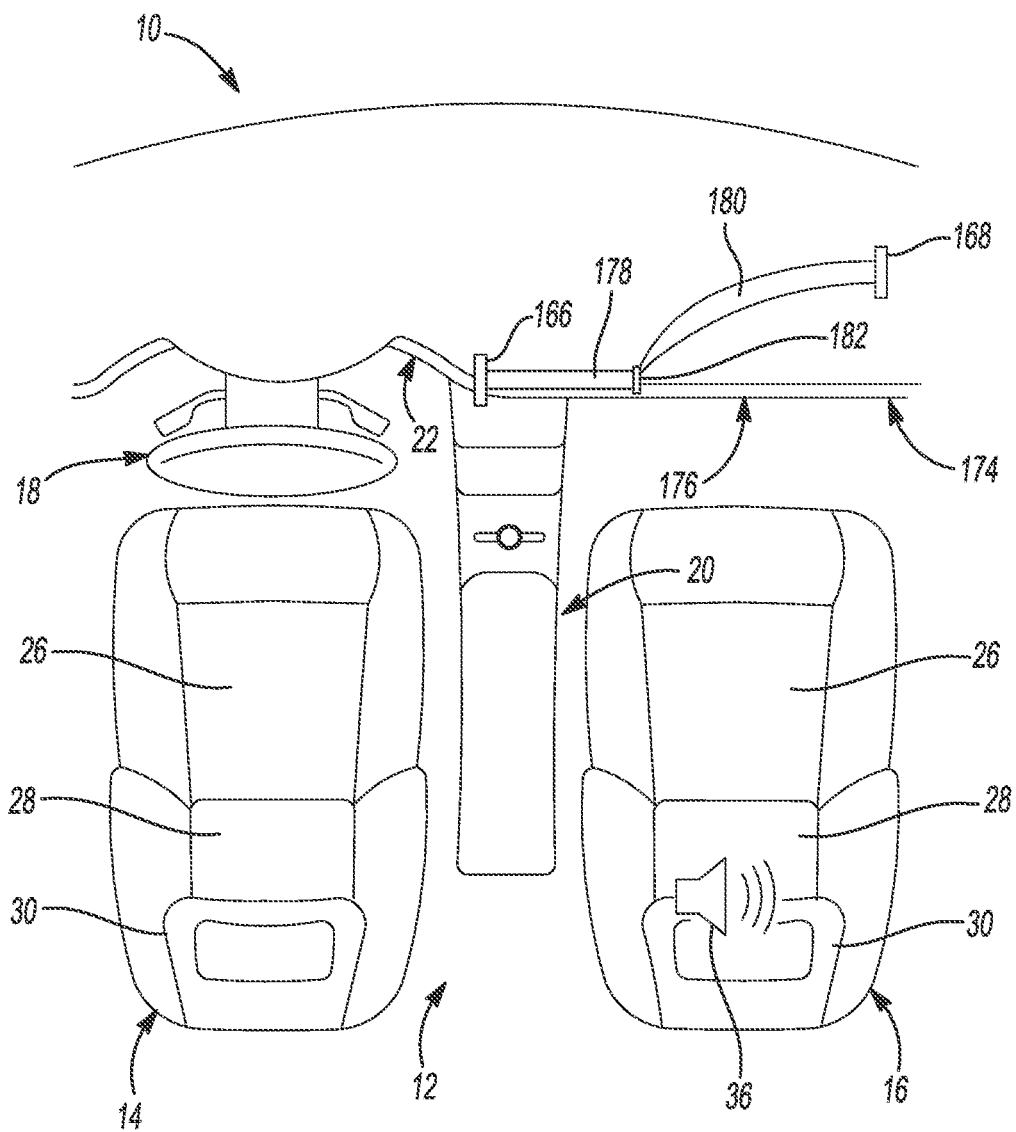
Figure 15:
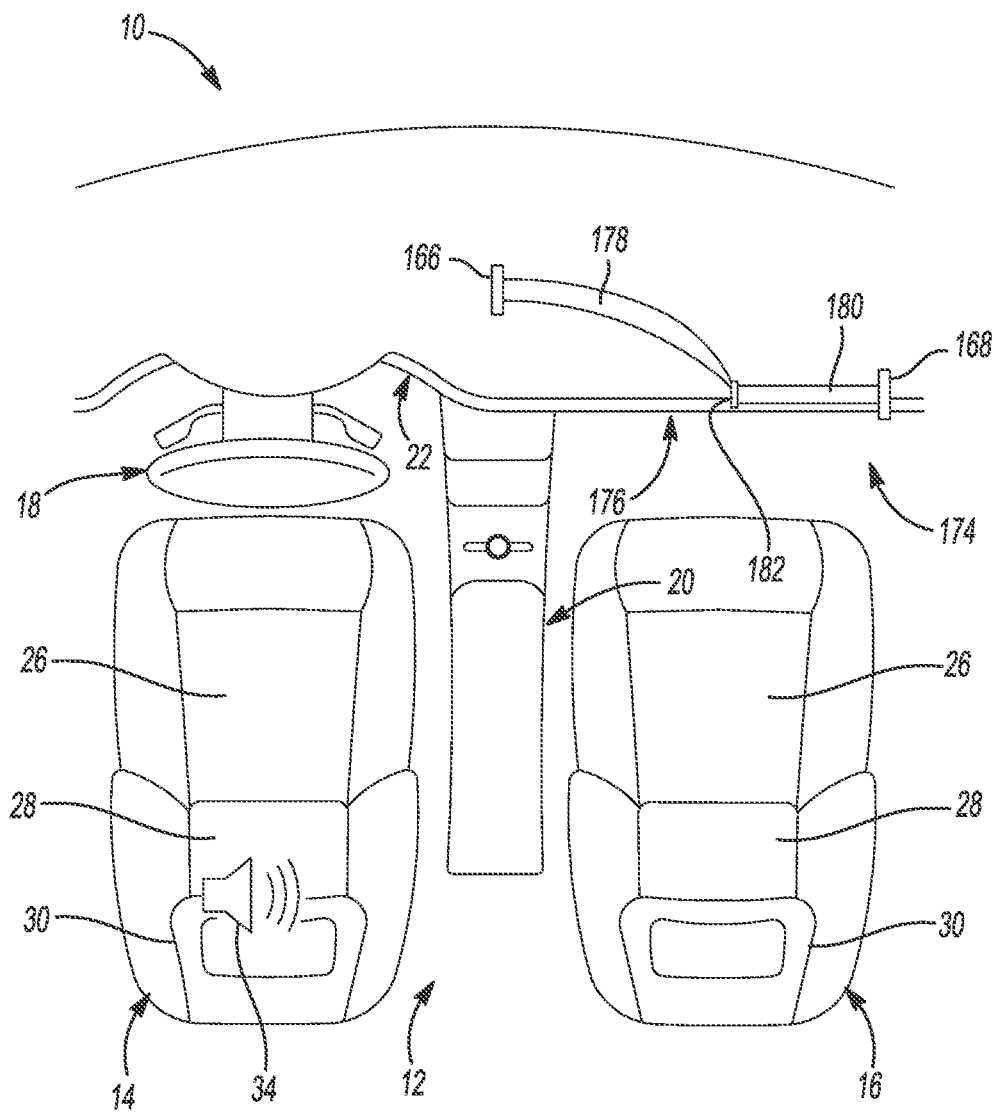

Referring now to FIGS. 13-15, the vehicle 10 is shown with a display assembly 174 in place of the display assembly 162. The display assembly 174 is similar to the display assembly 162 except that the display assembly 174 includes an electronic display 176 in place of the electronic display 164. Like the electronic display 164, the electronic display 176 may be a flexible electronic paper display or a flexible OLED display. In contrast to the electronic display 164, the electronic display 176 includes a first screen 178, a second screen 180, and a hinge 182 disposed between the first and second screens 178 and 180. The hinge 182 may be a living hinge (e.g., an area of the electronic display 176 having a reduced material thickness relative to the remainder of the electronic display 176). To this end, the electronic display 176 may be a single display mounted on a single substrate, the first and second screens 178 and 180 may be different sections of the substrate, and the hinge 182 may also be part of the substrate. Alternatively, the first and second screens 178 and 180 may be multiple separate displays that are attached together by the hinge 182, which may also be a separate component from the first and second screens 178 and 180. In this latter example, the first and second screens 178 and 180 can be folded about the hinge 182, or the first and second screens 178 and 180 can be unfolded to give the appearance of a single display.

The electronic display 176 can be flexed to adjust a viewing angle of an occupant of the vehicle 10 relative to the electronic display 176. In addition, the electronic display 176 can be folded at the hinge 182, which enables one of the first and second screens 178 and 180 to have a flat profile while the other one of the first and second screens 178 and 180 has a curved profile. In FIG. 13, the electronic display 176 is not flexed or folded, and therefore each of the first and second screens 178 and 180 has a flat profile. In addition, the electronic display 176 is located at a position along the slider mechanisms 166, 168 that is closest to the first and second seats 14 and 16. The system control module 46 may adjust the electronic display 176 to this configuration when controlling the first and second screens 178 and 180 to display interactive media in order to reduce the distance by which an occupant in the first or second seat 14 or 16 must reach to touch the screens 178, 180.

In FIG. 14, the electronic display 176 is flexed so that the second screen 180 has a curved profile, faces toward an occupant in the second seat 16, and faces away from an occupant in the first seat 14. In addition, the electronic display 176 is folded at the hinge 182, and the first screen 178 has a flat profile. The system control module 46 may adjust the electronic display 176 to this configuration when controlling the first screen 178 to display interactive media and controlling the second screen 180 to display video. In addition, the system control module 46 may control only the second speaker 36 to play audio corresponding to the media displayed by the second screen 180.

In FIG. 15, the electronic display 176 is flexed so that the first screen 178 has a curved profile, faces toward an occupant in the first seat 14, and faces away from an occupant in the second seat 16. In addition, the electronic display 176 is folded at the hinge 182, and the second screen 180 has a flat profile. The system control module 46 may adjust the electronic display 176 to this configuration when controlling the first screen 178 to display video and controlling the second screen 180 to display interactive media. In addition, the system control module 46 may control only the first speaker 34 to play audio corresponding to the media displayed by the first screen 178.

Although not shown in FIGS. 13-15, the adjustment mechanism 50 may maintain the electronic display 176 in any one of a plurality of shapes or configurations into which the electronic display 176 may be flexed and folded. The electronic display 176 may be flexed and folded manually or automatically. Although the system control module 46 and the actuator 60 are not shown in FIGS. 13-15, the system control module 46 may control the actuator 60 to flex and fold the electronic display 176 when the electronic display 176 is flexed and folded automatically.

Figure 16A:
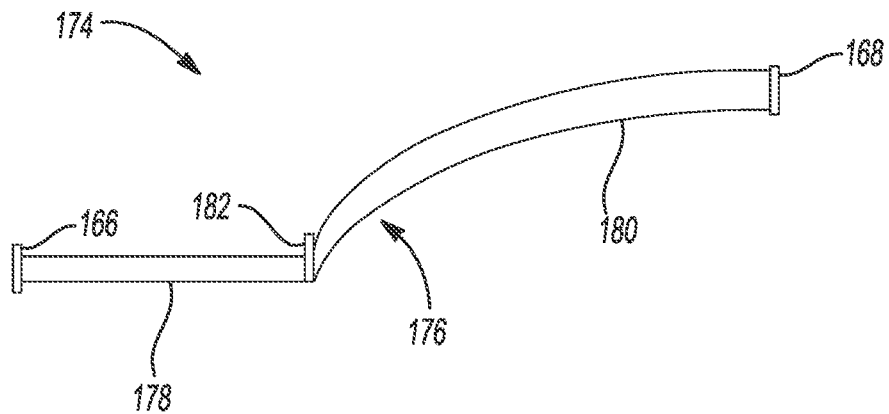
FIG. 16A is an enlarged plan view of the fifth example display assembly.
Figure 16B:
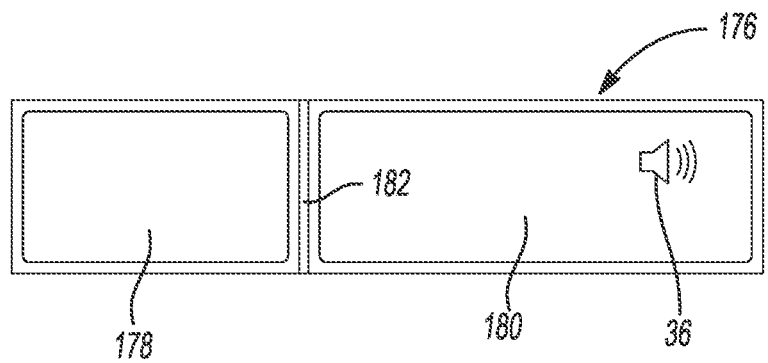
FIG. 16B is a front view of the fifth example display assembly.

FIGS. 16A and 16B show additional views of the display assembly 174 with the electronic display 176 flexed and folded into the configuration shown in FIG. 14. The system control module 46 may adjust the electronic display 176 to this configuration when controlling the first screen 178 to display interactive media and controlling the second screen 182 display video. In addition, the system control module 46 may control only the second speaker 36 to play audio corresponding to the video displayed by the second screen 182.

Figure 17:
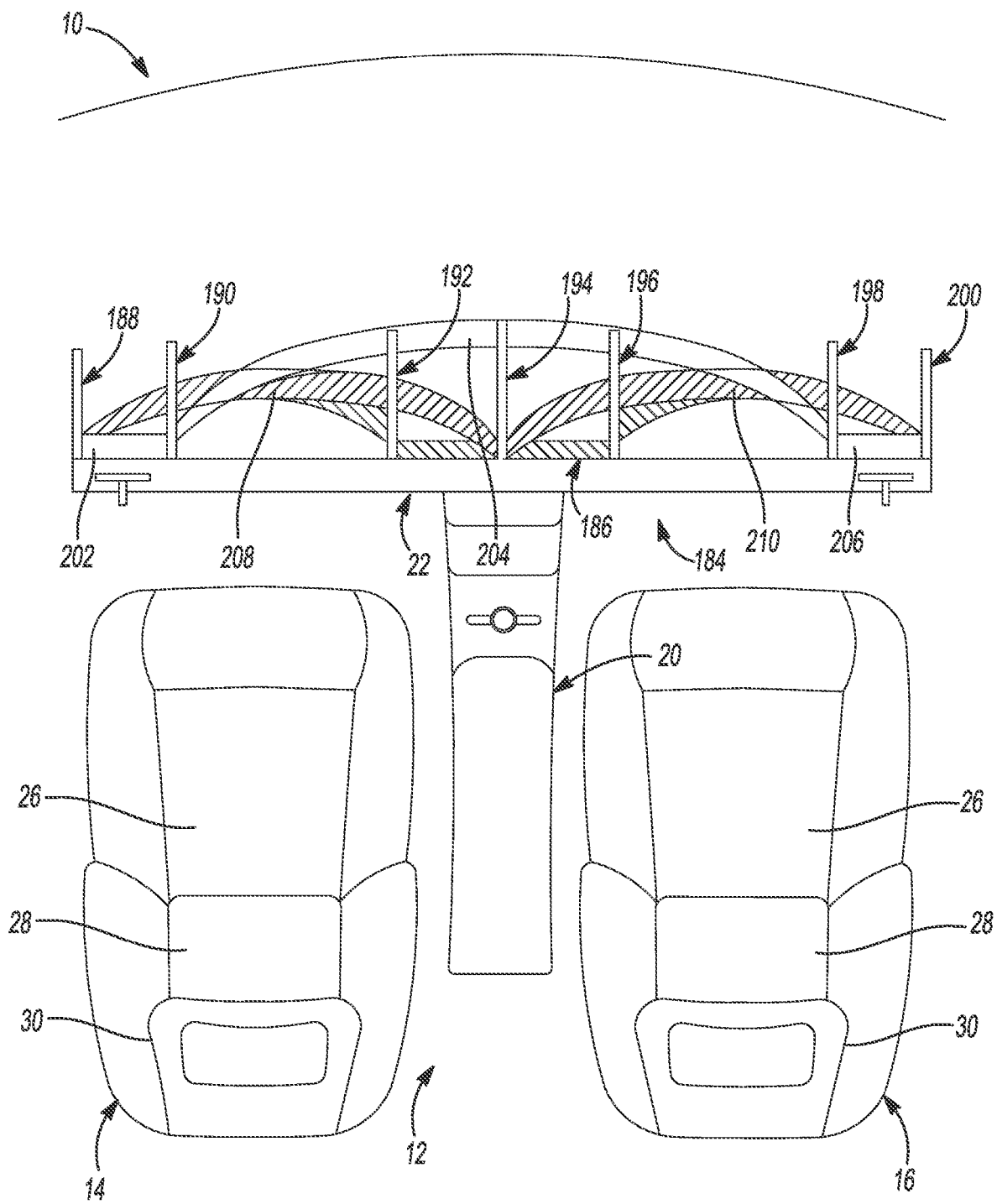
FIG. 17 is a plan view of the vehicle including a sixth example of a display assembly according to the principles of the present disclosure.

Referring now to FIG. 17, the vehicle 10 is shown with a display assembly 184 in place of the display assembly 174, and without the steering wheel 18. In this latter regard, the vehicle 10 may be an autonomous vehicle. The display assembly 184 includes an electronic display 186, a first slider mechanism 188, a second slider mechanism 190, a third slider mechanism 192, a fourth slider mechanism 194, a fifth slider mechanism 196, a six slider mechanism 198, and a seventh slider mechanism 200. The electronic display 186 may be a flexible electronic paper display or a flexible OLED display. Each of the slider mechanisms 188-200 may be similar or identical to the slider mechanism 132 of FIG. 9.

Each of the slider mechanisms 188-200 couples the electronic display 186 to the instrument panel 22 in a manner that allows the electronic display 186 to be flexed and folded. In addition, the electronic display 186 may include a hinge (e.g., a living hinge) at each location where the electronic display 186 is coupled to one of the slider mechanisms 188-200. The hinge(s) reduce stress in the electronic display 186 at locations where the electronic display 186 is folded, such as locations where the electronic display 186 transitions between a flat profile and a curved profile. The electronic display 186 may be a single display mounted on a single substrate, the single display may be folded about the hinge(s) to form multiple screens comprising different sections of the substrate, and the hinge(s) may also be part of the substrate. Alternatively, the screens formed by the electronic display 186 may be multiple separate displays that are attached together by the hinge(s), which may be separate from the screens. In this latter example, the screens formed by the electronic display 186 can be folded about the hinge(s), or the screens formed by the electronic display 186 can be unfolded to give the appearance of a single display.

FIG. 17 shows the electronic display 186 flexed and folded into three different configurations. In the first configuration, the electronic display 186 forms a first screen 202 having a flat profile extending between the first and second slider mechanisms 188 and 190, a second screen 204 having a curved profile extending between the second and sixth slider mechanisms 188 and 198, and a third screen 206 having a flat profile extending between the sixth and seventh slider mechanism 198 and 200. The electronic display 186 may include hinges at the locations where the electronic display 186 is coupled to the second and sixth slider mechanisms 190 and 198 to reduce the stresses in the electronic display 186 at the transitions between the screens 202-206.

In the second configuration, the electronic display 186 forms a first screen 208 having a curved profile extending between the first and fourth slider mechanisms 188 and 194, and a second screen 210 having a curved profile extending between the fourth and seventh slider mechanisms 194 and 200. The electronic display 186 may include hinges at the location where the electronic display 186 is coupled to the fourth slider mechanism 194 to reduce the stress in the electronic display 186 at the transition between the screens 208, 210. In the third configuration, the electronic display 196 forms a first screen 212 having a curved profile extending between the first and third slider mechanisms 188 and 92, a second screen 214 having a flat profile extending between the third and fifth slider mechanisms 192 and 196, and a third screen 216 having a curved profile extending between the fifth and seventh slider mechanisms 196 and 200. The electronic display 186 may include hinges at the locations where the electronic display 186 is coupled to the third and fifth slider mechanisms 192 and 196 to reduce the stresses in the electronic display 186 at the transitions between the screens 212-216.

Figure 18:
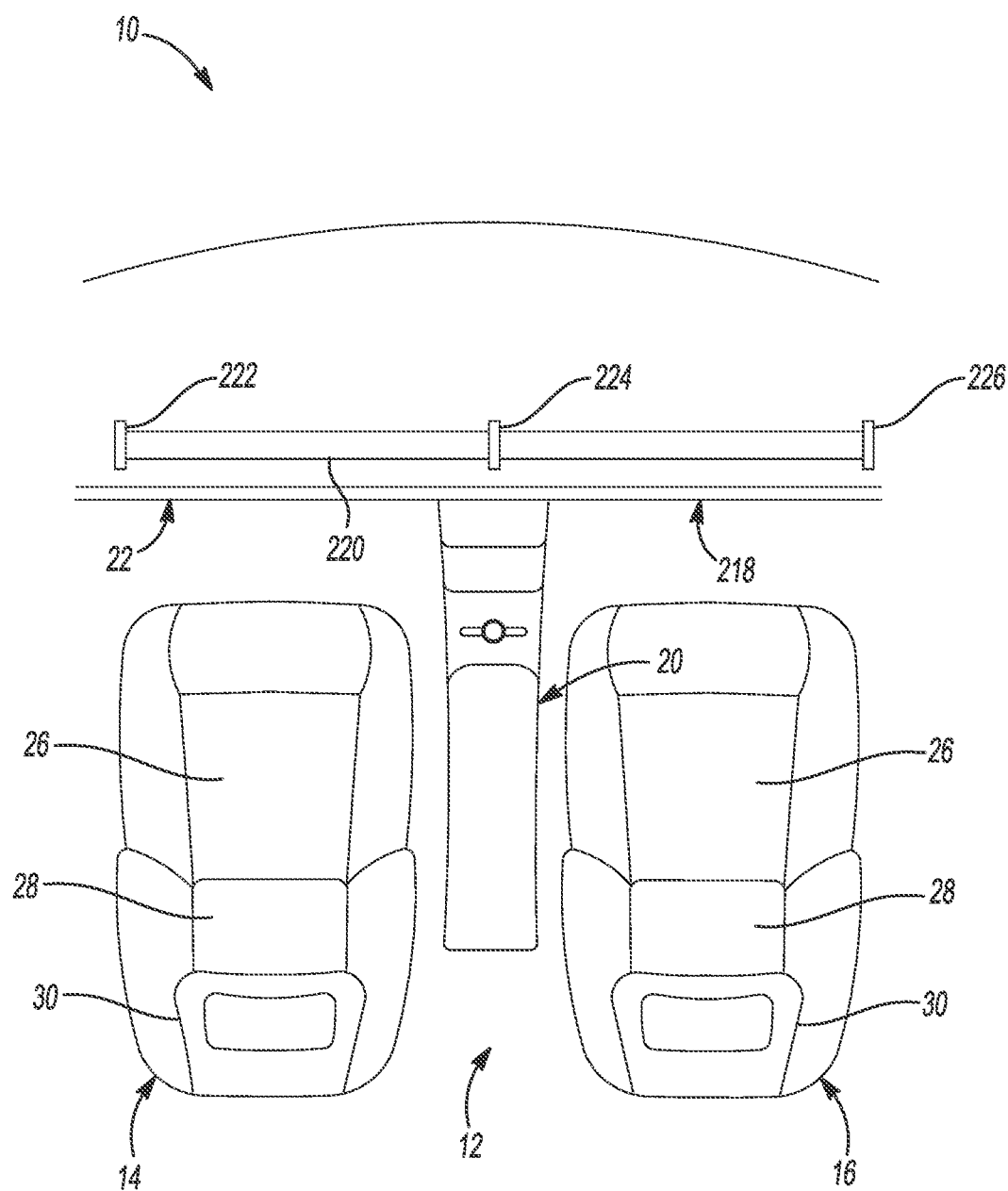
FIGS. 18 through 20 are plan views of the vehicle including a seventh example of a display assembly according to the principles of the present disclosure.
Figure 19:
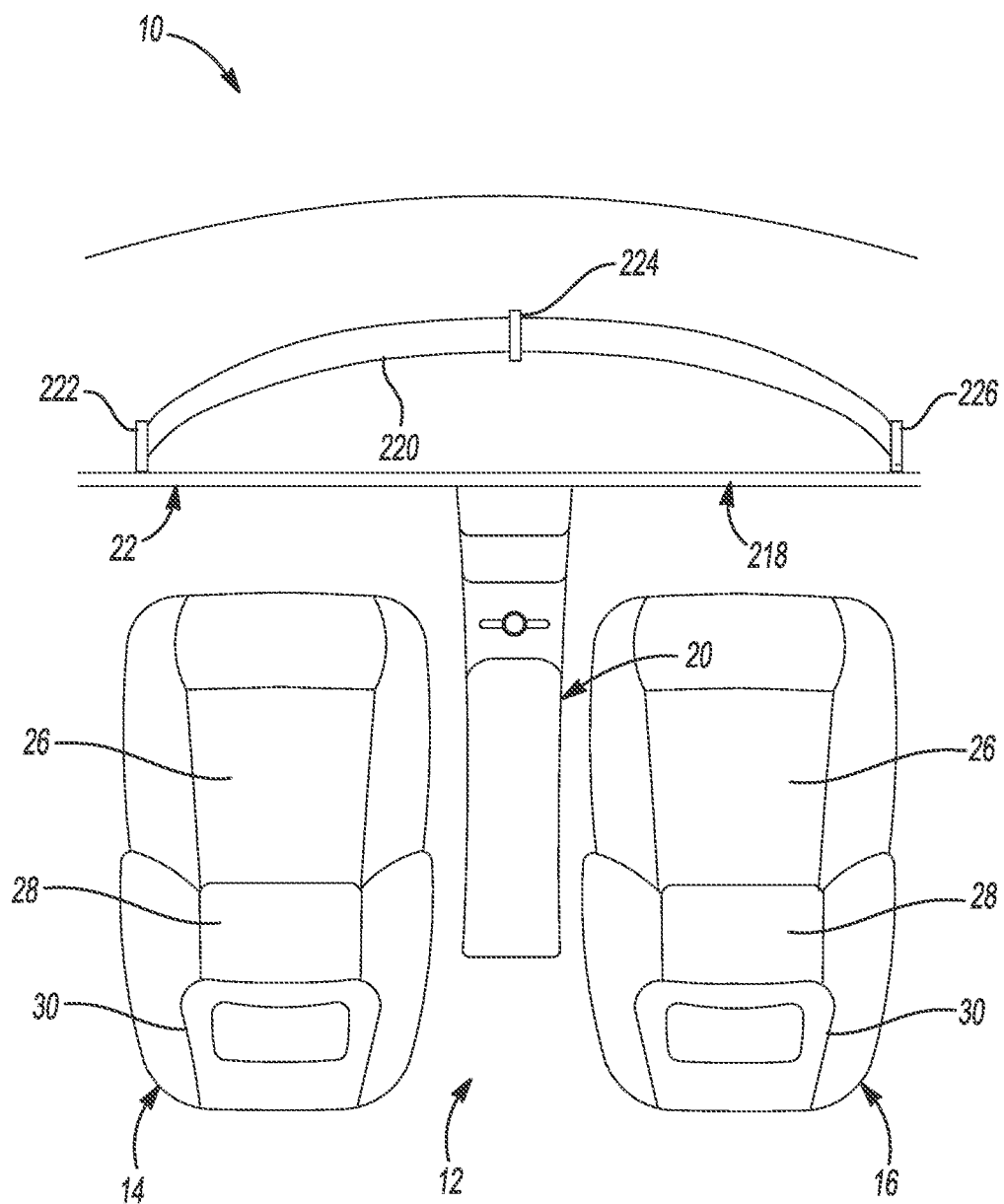
Figure 20:
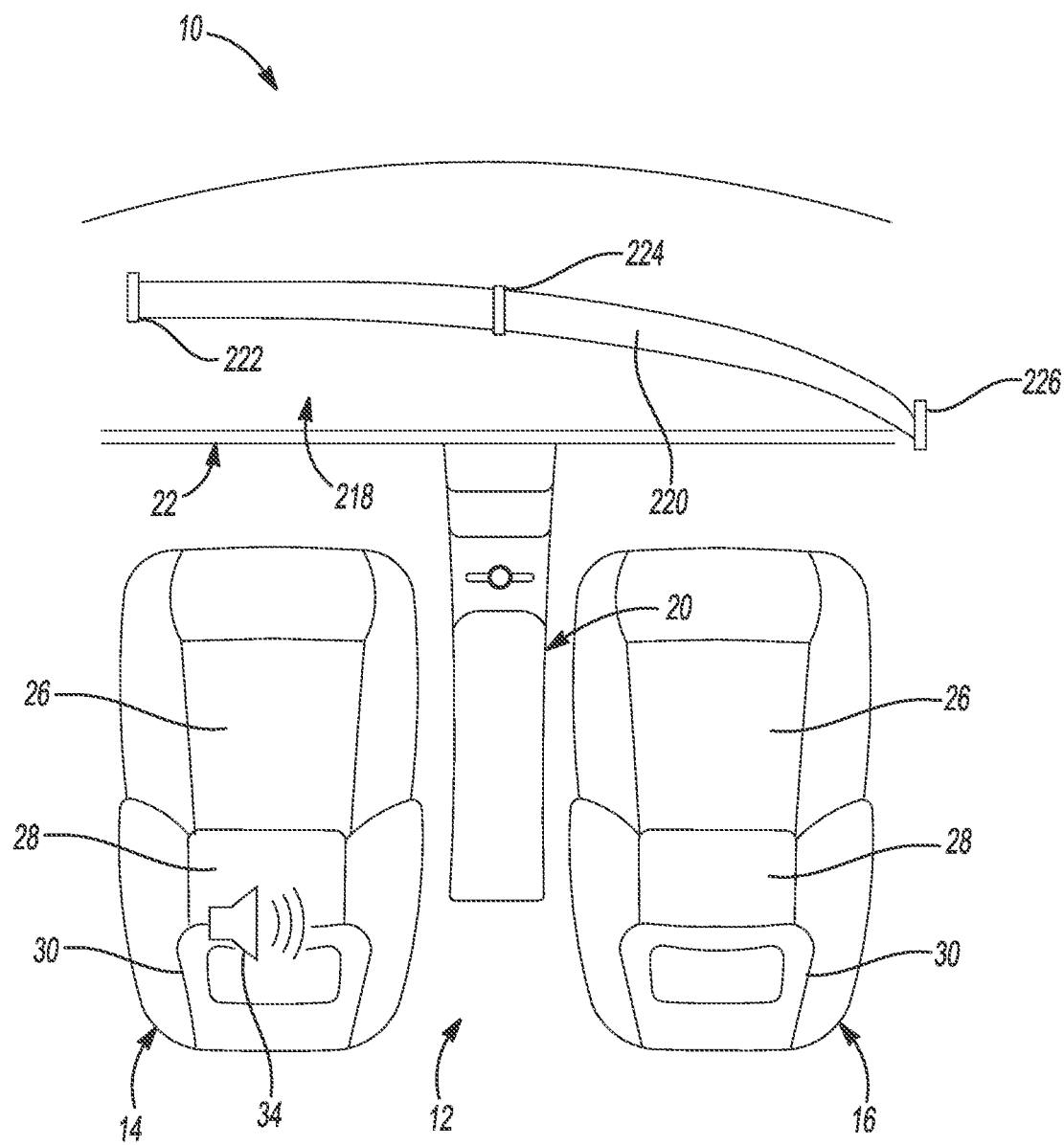

FIGS. 18-20 show the vehicle 10 with a display assembly 218 in place of the display assembly 184. The display assembly 218 includes an electronic display 220, a first slider mechanism 222, a second slider mechanism 224, and a third slider mechanism 226. The electronic display 220 may be a flexible electronic paper display or a flexible OLED display. Each of the slider mechanisms 222-226 may be similar or identical to the slider mechanism 132 of FIG. 9.

In FIG. 18, the electronic display 220 is not flexed or folded, and therefore the entire electronic display 220 has a flat profile. In addition, the electronic display 220 is located at a position along the slider mechanisms 222-226 that is closest to the first and second seats 14 and 16. The system control module 46 may adjust the electronic display 220 to this configuration when controlling the electronic display 220 to display interactive media. In FIG. 19, the electronic display 220 is flexed to have a curved profile extending between the first and third slider mechanisms 222 and 226 that optimizes the viewing angle for occupants in both the first and second seats 14 and 16. The system control module 46 may adjust the electronic display 220 to this configuration when controlling the electronic display 220 to display video for viewing by occupants in the first and second seats 14 and 16.

In FIG. 20, the electronic display 220 is flexed to have a curved profile extending between the first and third slider mechanisms 222 and 226 that optimizes the viewing angle for an occupant in the first seat 14. The system control module 46 may adjust the electronic display 220 to this configuration when controlling the electronic display 220 to display video for viewing by an occupant in the first seat 14. In addition, the system control module 46 may control only the first speaker 34 to play audio corresponding to the media displayed by the electronic display 220.

Figure 21:
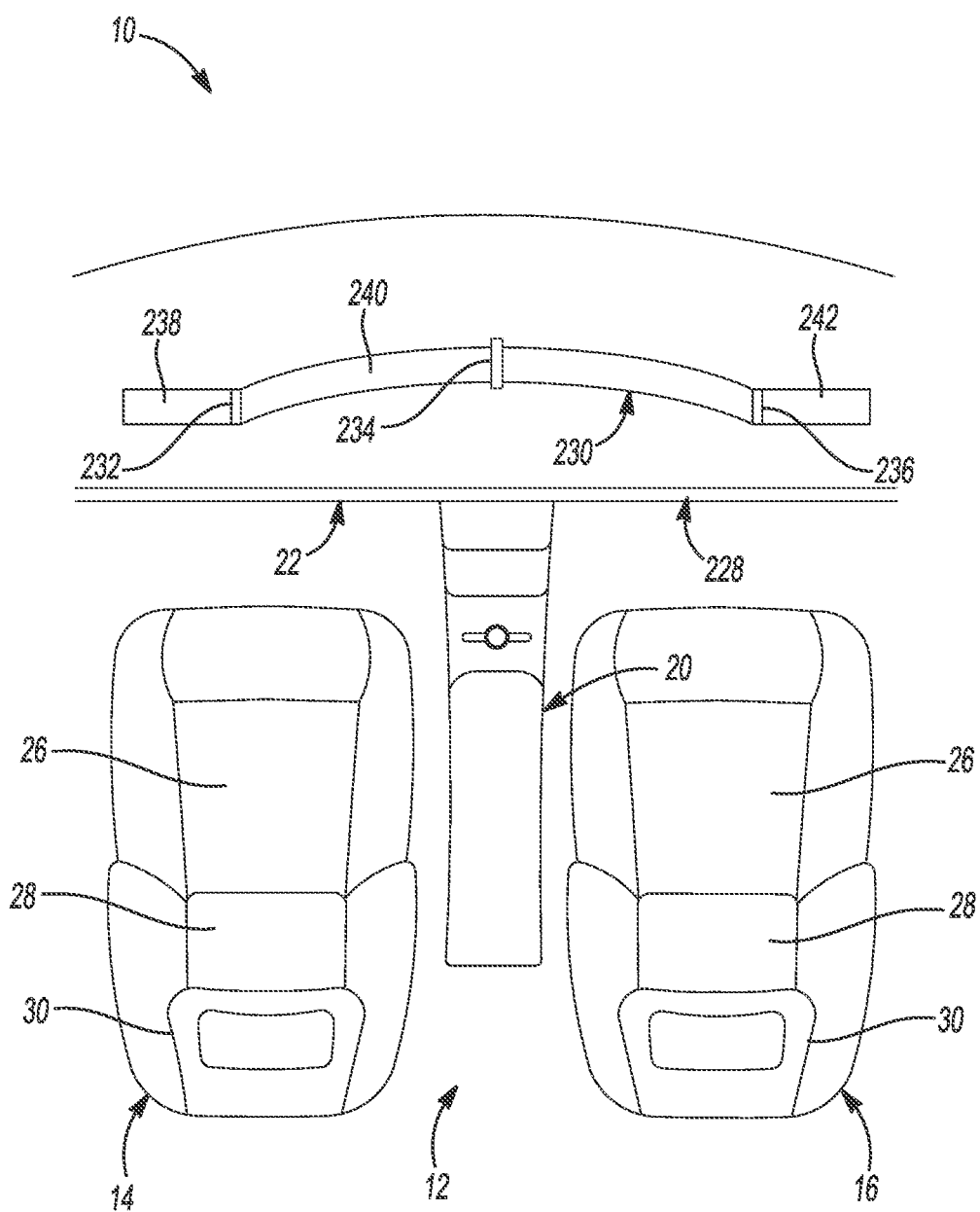
FIG. 21 is a plan view of the vehicle including an eighth example of a display assembly according to the principles of the present disclosure.
Figure 24A:
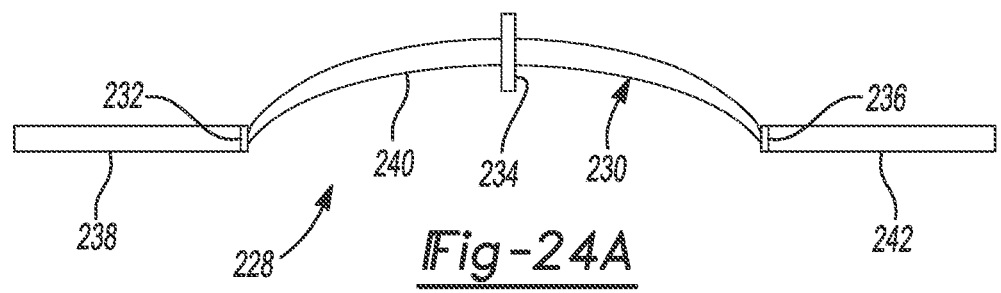
FIG. 24A is an enlarged plan view of the seventh example display assembly.
Figure 24B:
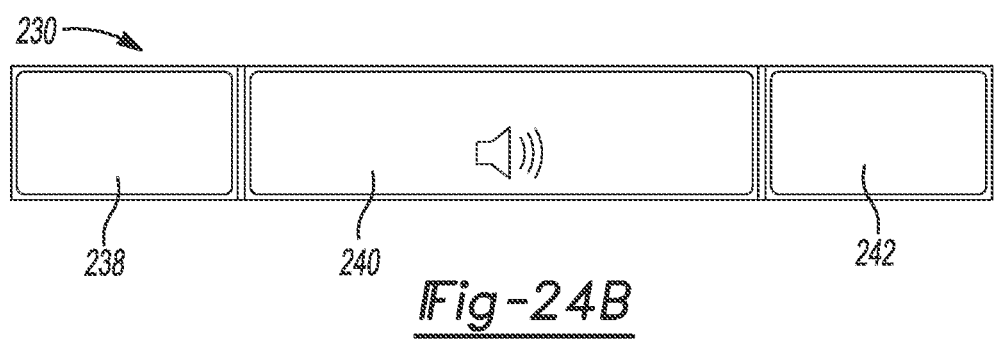
FIG. 24B is a front view of the seventh example display assembly.

FIG. 21 shows the vehicle 10 with a display assembly 228 in place of the display assembly 218. Additional views of the display assembly 228 are shown in FIGS. 24A and 24B. The display assembly 228 includes an electronic display 230, a first slider mechanism 232, a second slider mechanism 234, and a third slider mechanism 236. The electronic display 230 may be a flexible electronic paper display or a flexible OLED display. Each of the slider mechanisms 232-236 may be similar or identical to the slider mechanism 132 of FIG. 9.

In the configuration shown in FIG. 21, the electronic display 230 is positioned along the slider mechanisms 232-236 to form a first screen 238, a second screen 240, and a third screen 242. The first screen 238 is located to the left of the first slider mechanism 232. The second screen 240 is located between the first and third slider mechanisms 232 and 236. The third screen 242 is located to the right of the third slider mechanism 236.

The first and third screens 238 and 242 have flat profiles and are positioned as close to the first and second seats 14 and 16 as the slider mechanism 232-236 allow. The second screen 240 has a curved profile that optimizes the viewing angle for occupants in both the first and second seats 14 and 16. The system control module 46 may adjust the electronic display 230 to this configuration when controlling the first screen 238 to display interactive media for an occupant in the first seat 14, controlling the second screen 240 to play video for occupants in both the first and second seats 14 and 16, and controlling the third screen to display interactive media for an occupant in the second seat 16.

Figure 22:
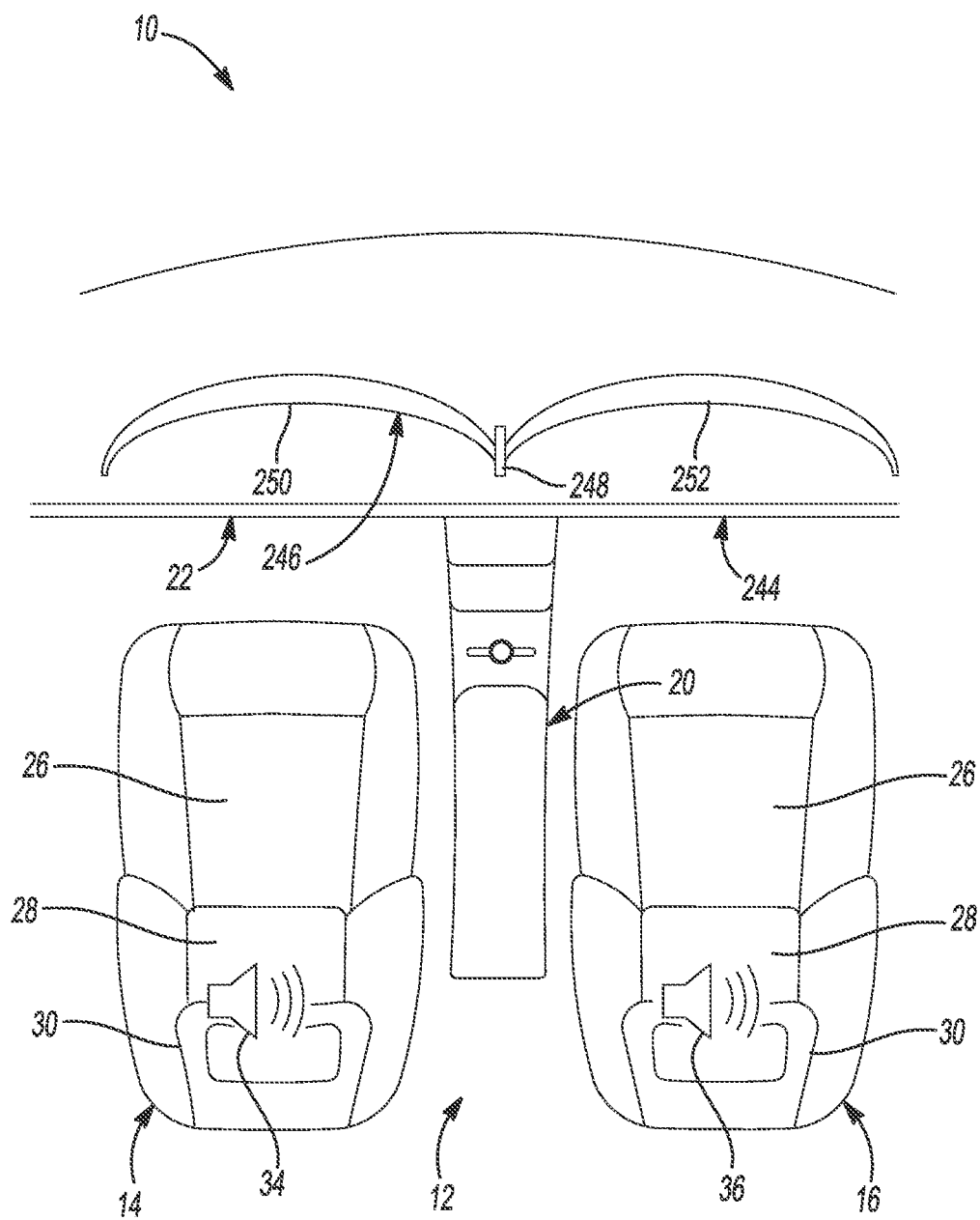
FIG. 22 is a plan view of the vehicle including the seventh example display assembly.
Figure 25A:
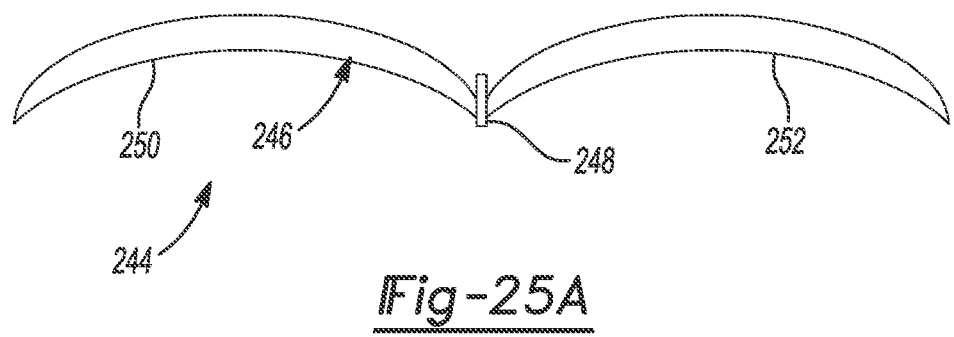
FIG. 25A is an enlarged plan view of the eighth example display assembly.
Figure 25B:
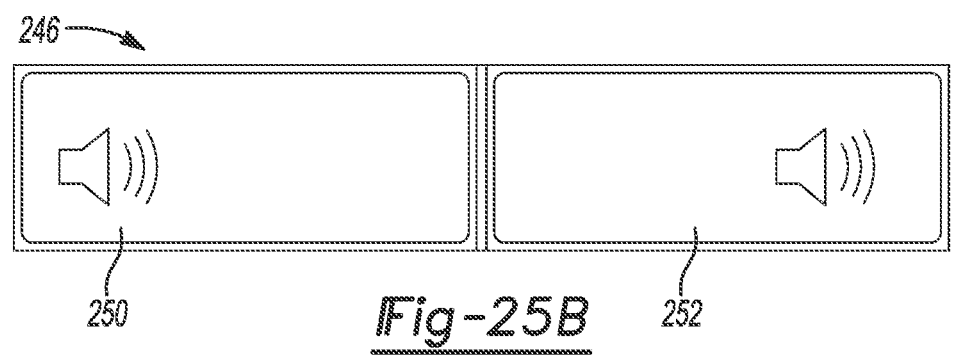
FIG. 25B is a front view of the eighth example display assembly.

FIG. 22 shows the vehicle 10 with a display assembly 244 in place of the display assembly 228. Additional views of the display assembly 244 are shown in FIGS. 25A and 25B. The display assembly 228 includes an electronic display 246 and a slider mechanism 248. The electronic display 246 may be a flexible electronic paper display or a flexible OLED display. The slider mechanisms 248 may be similar or identical to the slider mechanism 132 of FIG. 9.

In the configuration shown in FIG. 22, the electronic display 246 is positioned along the slider mechanism 248 to form a first screen 250 and a second screen 252. The first screen 250 is located to the left of the slider mechanism 248 and has a curved profile that optimizes the viewing angle for an occupant in the first seat 14. The second screen 252 is located to the right of the slider mechanism 248 and has a curved profile that optimizes the viewing angle for an occupant in the second seat 16. The system control module 46 may adjust the electronic display 230 to this configuration when controlling the first screen 250 to display video for an occupant in the first seat 14 and controlling the second screen 252 to display video for an occupant in the second seat 16. In addition, the system control module 46 may control only the first speaker 34 to play audio corresponding to the video displayed by the first screen 250, and the system control module 46 may control only the second speaker 36 to play audio corresponding to the video displayed by the second screen 252.

Figure 23:
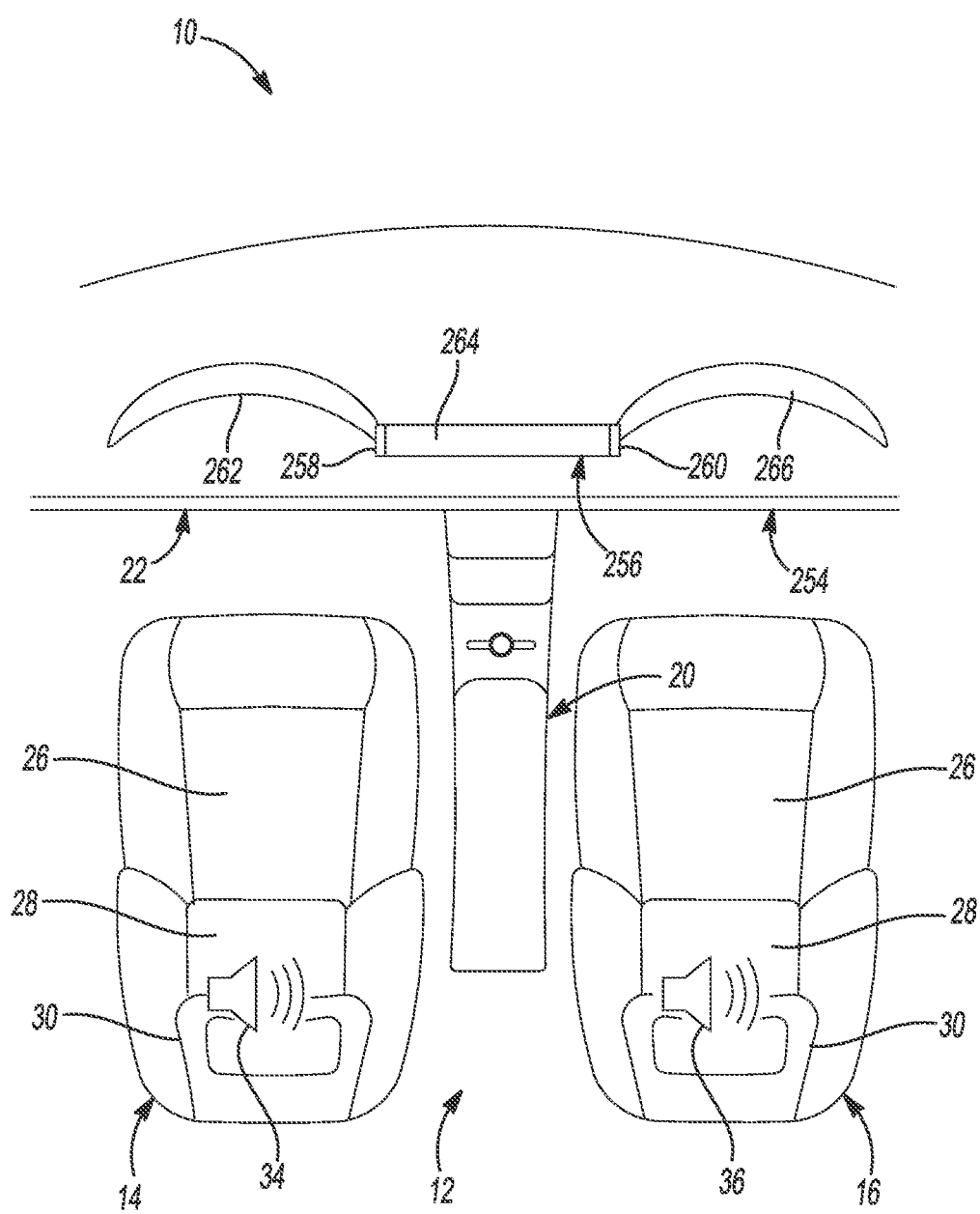
FIG. 23 is a plan view of the vehicle including a seventh example of the display assembly according to the principles of the present disclosure.
Figure 26A:
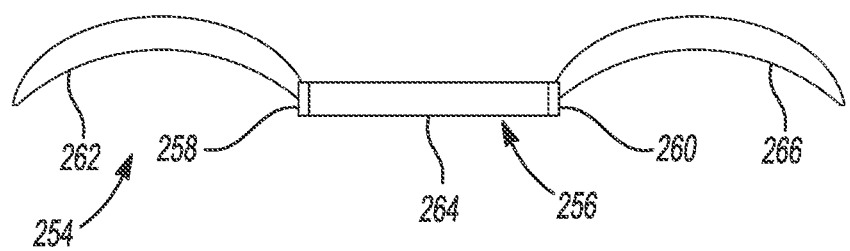
FIG. 26A is an enlarged plan view of the ninth example display assembly.
Figure 26B:
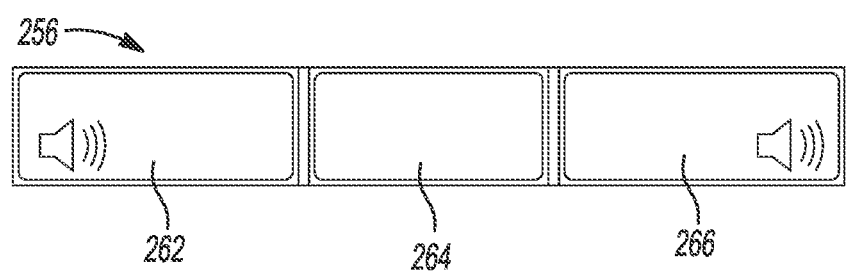
FIG. 26B is a front view of the ninth example display assembly.

FIG. 23 shows the vehicle 10 with a display assembly 254 in place of the display assembly 244. Additional views of the display assembly 254 are shown in FIGS. 26A and 26B. The display assembly 254 includes an electronic display 256, a first slider mechanism 258, and a second slider mechanism 260. The electronic display 256 may be a flexible electronic paper display or a flexible OLED display. Each of the slider mechanisms 258, 260 may be similar or identical to the slider mechanism 132 of FIG. 9.

In the configuration shown in FIG. 23, the electronic display 256 is positioned along the slider mechanisms 258, 260 to form a first screen 262, a second screen 264, and a third screen 266. The first screen 262 is located to the left of the first slider mechanism 258 and has a curved profile that optimizes the viewing angle for an occupant in the first seat 14. The second screen 264 is located between the slider mechanism 258, 260, has a flat profile, and is positioned as close to the first and second seats 14 and 16 as the slider mechanism 258, 260 allow. The third screen 266 is located to the right of the second slider mechanism 260 and has a curved profile that optimizes the viewing angle for an occupant in the second seat 16. The system control module 46 may adjust the electronic display 256 to this configuration when controlling the first screen 262 to display video for an occupant in the first seat 14, controlling the second screen 264 to display interactive media for occupants in the first and second seats 14 and 16, and controlling the this screen 266 to display video for an occupant in the second seat 16. In addition, the system control module 46 may control only the first speaker 34 to play audio corresponding to the video displayed by the first screen 262, and the system control module 46 may control only the second speaker 36 to play audio corresponding to the video displayed by the third screen 266.

Figure 27:
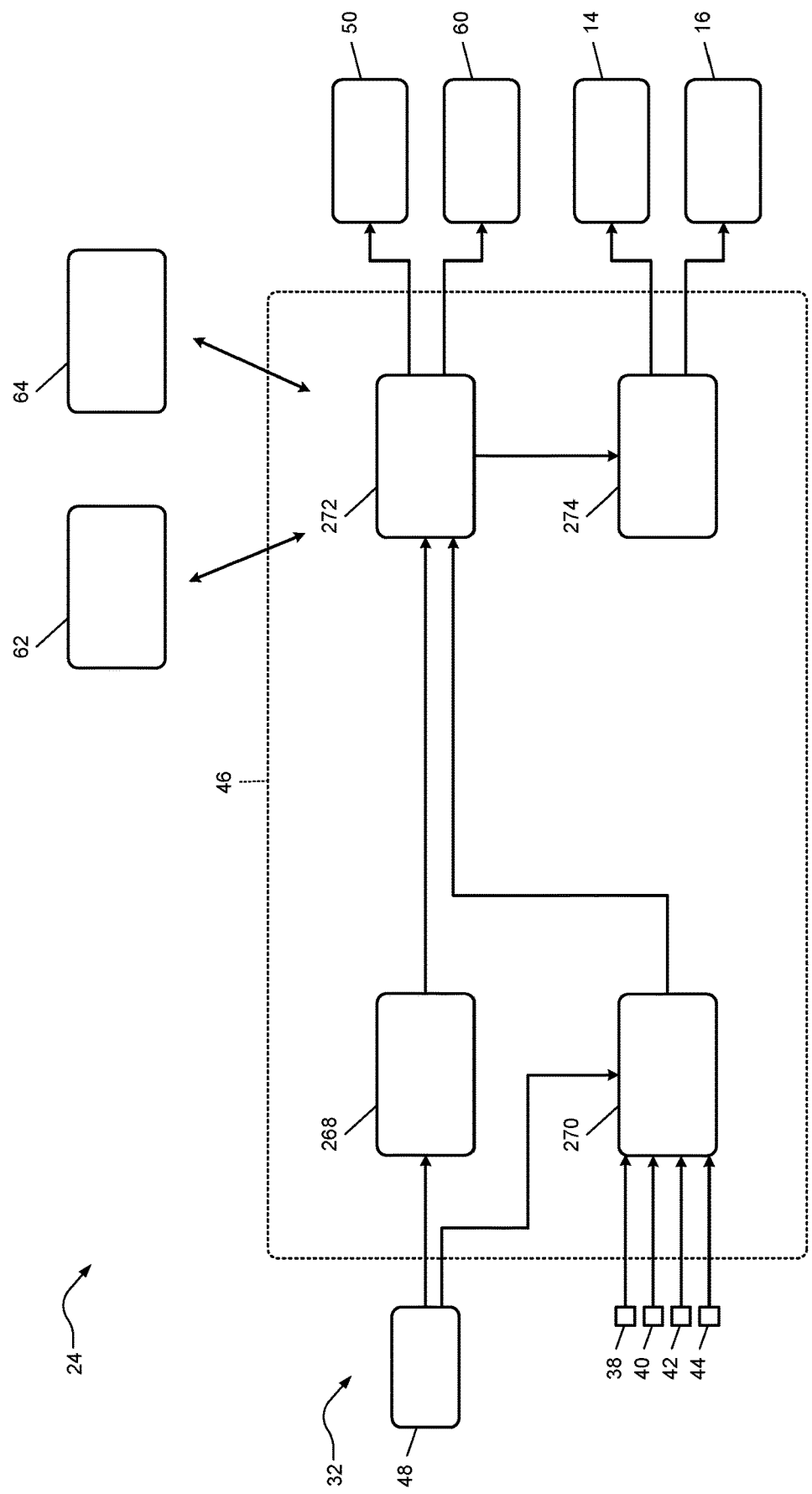
FIG. 27 is a functional block diagram of an example infotainment system according to the present disclosure.

Referring now to FIG. 27, an example implementation of the system control module 46 includes a media type module 268, an occupant module 270, the display control module 272, and a speaker control module 274. The media type module 268 determines the type(s) of media being displayed by the electronic display 48 (or any of the electronic displays described herein). The media type module 268 may make this determination based on a signal from the electronic display 48. The media type module 268 outputs a signal indicating the type(s) of media being displayed by the electronic display 48.

In various implementations, the display control module 272 may control the media displayed by the electronic display 48. In these implementations, the media type module

268 may determine the type(s) of media being displayed based on a signal from the display control module 272. Alternatively, the media type module 268 may be omitted, and the display control module 272 may determine the type(s) of media being displayed by the electronic display 48 based on a signal output by the display control module 272 to control media displayed by the electronic display 48.

The occupant module 270 determines whether any occupants are present in the cabin 12 of the vehicle 10 and, if so, the location of the occupant(s). The occupant module 270 may determine whether an occupant is present (and located) in the first seat 14 based on input(s) from the first camera 38 and/or the first infrared sensor 42. The occupant module 270 may determine whether an occupant is present (and located) in the second seat 16 based on input(s) from the second camera 40 and/or the second infrared sensor 44. The occupant module 270 outputs a signal indicating the location of occupant(s) in the cabin 12 of the vehicle 10.

The occupant module 270 may also determine the identity of an occupant in the cabin 12 the vehicle 10, the maximum reach of the occupant, and/or the behavior of the occupant (e.g., direction of eye gaze, reaching out to touch the electronic display 48). The occupant module 270 may determine the identity, the maximum reach, and/or the behavior of an occupant in the first seat 14 based on input(s) from the first camera 38 and/or the first infrared sensor 42. The occupant module 270 may determine the identity, the maximum reach, and/or the behavior of an occupant in the second seat 16 based on input(s) from the second camera 40 and/or the second infrared sensor 44. In various implementations, the electronic display 48 may be a capacitive touchscreen, and the occupant module 270 may determine whether the occupant in the first or second seat 14 or 16 is reaching out to touch the electronic display 48 based on an input from the electronic display 48. In addition to indicating the location of occupant(s) in the cabin 12 of the vehicle 10, the signal output by the occupant module 270 may indicate the identity, maximum reach, and/or behavior of the occupant(s).

The display control module 272 controls the amount of resistive force produced by the adjustment mechanism 50 to adjust the amount of effort required by a user to manually adjust the configuration of the electronic display 48 (or any of the electronic displays described herein). The display control module 272 may control the amount of resistive force produced by the adjustment mechanism 50 based on an input received from the user. For example, the electronic display 48 may be a touchscreen, and the user may indicate a desire amount of the force produced by the adjustment mechanism 50 by manipulating the touchscreen.

The display control module 272 controls the amount of resistive force produced by the adjustment mechanism 50 by outputting a signal to the adjustment mechanism 50. The signal may indicate the amount of power to be supplied to the electric magnet in the adjustment mechanism 50 in order to adjust the viscosity of magnetorheological fluid contained within the tube 66 of the adjustment mechanism 50 to a target viscosity. The adjustment mechanism 50 may include a power supply that regulates the power supplied to the electric magnet based on the signal.

The display control module 272 controls the position of the actuator 60 to adjust the configuration of the electronic display 48. The display control module 272 may adjust the configuration of the electronic display 48 based on the type(s) of media being displayed by the electronic display 48, the location(s) of occupant(s) in the vehicle 10, the identity of the occupant(s), and/or the behavior of occupant(s). The display control module 272 may adjust the configuration of the electronic display 48 (or any of the electronic displays described herein) based on the type(s) of media being displayed thereby. The display control module 272 may do this in any of the ways in which the system control module 46 does so as described above. Additionally or alternatively, the display control module 272 may adjust the configuration of the electronic display based on one or inputs from the satellite 62 and/or the cell tower 64. These inputs may include the current time of day, the current day of the week, the current weather, the geographic location of the vehicle 10, and the route in which the vehicle 10 traveling.

The display control module 272 controls the actuator 60 by outputting a signal to the actuator 60. The signal may indicate a target position of the actuator 60. In various implementations, the display assembly 32 (or any of the display assemblies described herein) may include multiple ones of the actuator 60 as discussed above, and the signal output by the display control module 272 may a target position for each actuator 60. The display control module 272 may determine the target position of each actuator 60 based on a predetermined relationship between the positions of the actuators 60 and the configuration of the electronic display 48.

The speaker control module 274 controls the audio played by the first and second speakers 34 and 36. The speaker control module 274 may control the audio played by the first and second speakers 34 and 36 based on the current configuration of the electronic display 48 (or any of the electronic displays described herein). The speaker control module 274 may do this in any of the ways in which the system control module 46 does so as described above.

Figure 28:
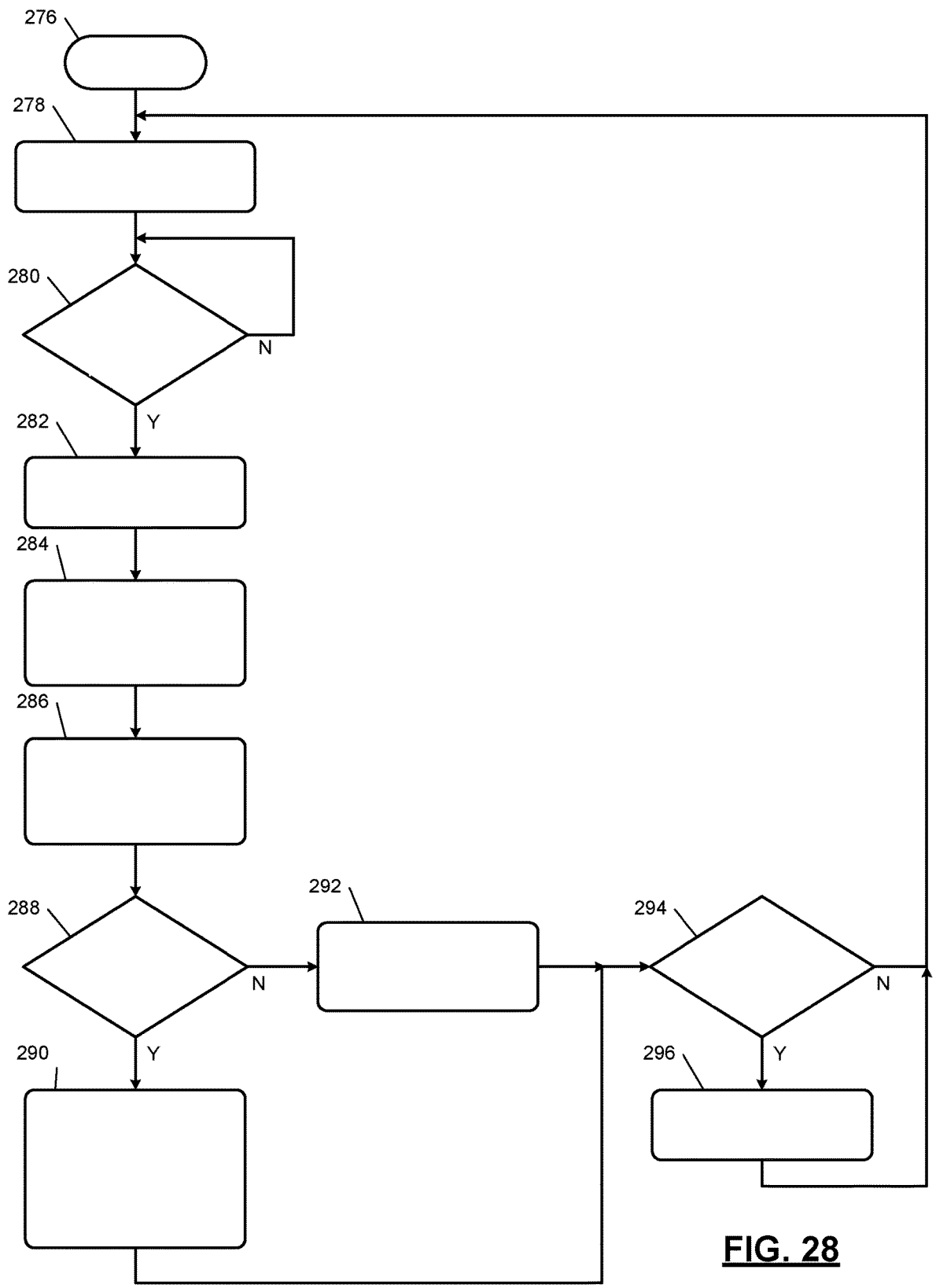
FIG. 28 is flowchart illustrating an example method of controlling an infotainment system according to the present disclosure.

Referring now to FIG. 28, a method for controlling the infotainment system 24 begins at 276. The method is described in the context of the display assembly 32 of FIGS. 1-3 and the modules of FIG. 27. However, the method may be used to control any of the display assemblies disclosed herein. In addition, the particular modules that perform the steps of the method may be different than the modules mentioned below and/or one or more steps of the method may be implemented apart from the modules of FIG. 27.

At 278, the occupant module 270 determines the location(s) and/or behavior of user(s) in the vehicle 10. At 280, the display control module 272 determines whether a user has entered the vehicle 10 or change positions within the vehicle 10. The display control module 272 may make this determination based on the input from the occupant module 270. Alternatively, the display control module 272 may make this determination based on an input from the user received via, for example, the user manipulating a touchscreen, which may be part of the electronic display 48. If a user has entered the vehicle 10 or changed positions within the vehicle 10, the method continues at 282. Otherwise, the method remains at 280.

At 282, the media type module 268 determines the type(s) of media being displayed by the electronic display 48 (or any of the electronic displays described herein). At 284, the display control module 272 determines the current time of day, the current day of the week, the current weather, the geographic location of the vehicle 10, and the route in which the vehicle 10 is traveling. The display control module 272 may make these determinations based on inputs from the satellite 62 and/or the cell tower 64. Additionally or alternatively, the display control module 272 may determine the route in which the vehicle 10 is traveling on an input from a navigation system of the vehicle 10, which may be part of the electronic display 48.

At 286, the display control module 272 determines the orientation or configuration of the electronic display 48 (or any of the electronic displays described herein) that optimizes the viewing experience of the user(s) in the vehicle 10. The display control module 272 may do this in any of the ways in which the system control module 46 does so as described above. For example, the display control module 272 may adjust the electronic display 48 to have a flat profile positioned close to the first seat 14 when the electronic display 48 is displaying active media for an occupant in the first seat 14. In another example, the display control module 272 may adjust the electronic display 48 to have a curved profile that faces toward the second seat 16 and away from the first seat 14 when the electronic display 48 is displaying video for an occupant in the second seat 16. In yet another example, the display control module 272 may adjust the electronic display 48 to have a curved profile that optimizes the viewing angle for occupants in both the first and second seats 14 and 16 when the vehicle 10 is an autonomous vehicle, the occupant are present in the first and second seats 14 and 16, and the electronic display 48 is displaying video.

When determining the optimal configuration of the electronic display 48, the display control module 272 may account for the current time of day, the current day of the week, the current weather, the geographic location of the vehicle 10, and/or the route in which the vehicle 10 is traveling. For example, the display control module 272 may determine whether there may be glare on the electronic display 48 based on the current time of day and/or the current weather, and determine the orientation of the electronic display 48 that minimizes or prevents glare. Additionally or alternatively, when determining the optimal configuration of the electronic display 48, the display control module 272 may account for the identity, maximum reach, and/or behavior of the user(s). For example, when a user in the first seat 14 is reaching toward the electronic display 48, the display control module 272 may determine that the optimal configuration of the electronic display 48 includes a flat profile located near the first seat 14.

At 288, the display control module 272 determines whether the electronic display 48 is in the optimal configuration. If the electronic display 48 is in the optimal configuration, the method content at 290. Otherwise, the method continues at 292. At 290, the display control module 272 maintains the electronic display 48 current configuration. In addition, the speaker control module 274 personalizes the audio delivered to each user in the vehicle 10 based on the type(s) of media being played by the electronic display 48 (or any of the electronic displays described herein). The speaker control module 274 may do this in any of the ways in which the system control module 46 does so as described above. The method then continues at 294.

At 292, the display control module 272 controls the actuator 60 to automatically fold and/or flex the electronic display 48 into the optimal configuration. The method then continues at 294. At 294, the display control module 272 determines whether a user in the vehicle 10 wants to change the orientation of the electronic display 48. The display control module 272 may make this determination based on an input from the user received via, for example, the user manipulating a touchscreen, which may be part of the electronic display 48. If the user wants to change the orientation of the electronic display 48, the method continues at 296. Otherwise, the method returns to 278.

At 296, the user manually adjusts the orientation of the electronic display 48. In addition, the display control module 272 may decouple the actuator 60 from the electronic display 48 to enable the user to manually adjust the electronic display 48. After 296, the method returns to 278.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

When an element or layer is referred to as being "on," "engaged to," "connected to," or "coupled to" another element or layer, it may be directly on, engaged, connected or coupled to the other element or layer, or intervening elements or layers may be present. In contrast, when an element or layer is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 88 degrees or at other orientations) and the spatially relative descriptors used herein interpreted accordingly.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A display assembly for a vehicle, the display assembly comprising:
    an electronic display configured to be mounted to an instrument panel of the vehicle, the electronic display including multiple screens and at least one hinge disposed between the multiple screens, wherein the electronic display is configured to be folded at the at least one hinge by pivoting at least one screen of the multiple screens about the at least one hinge to adjust a viewing angle of an occupant in the vehicle relative to the at least one screen; and
    an adjustment mechanism configured to maintain the at least one screen in any one of a plurality of positions when the electronic display is folded at the at least one hinge by pivoting the at least one screen about the at least one hinge to adjust the at least one screen to the one position, wherein the adjustment mechanism includes:
        a tube configured to be mounted to the instrument panel; and
        a rod having a first end attached to the at least one screen and a second end disposed within the tube, wherein the rod is slidable relative to the tube.

2. The display assembly of claim 1 wherein the at least one hinge includes a plurality of hinges.

3. The display assembly of claim 1 wherein:
    the multiple screens include a first screen and a second screen;

the at least one hinge includes a first hinge disposed between the first and second screens;
the first screen is configured to be mounted to the instrument panel; and
the second screen is configured to be pivoted about the first hinge to adjust the viewing angle of the occupant relative to the second screen.

4. The display assembly of claim 3 wherein:
the multiple screens further include a third screen;
the at least one hinge includes a second hinge disposed between the first and third screens; and
the third screen is configured to be pivoted about the second hinge to adjust the viewing angle of the occupant relative to the third screen.

5. The display assembly of claim 4 wherein:
the second screen is configured to be pivoted about the first hinge such that the second screen is angled toward a first occupant on a first side of the vehicle, and
the third screen is configured to be pivoted about the second hinge such that the third screen is angled toward a second occupant on a second side of the vehicle opposite of the first side.

6. The display assembly of claim 1 wherein:
the tube of the adjustment mechanism is configured to contain magnetorheological fluid; and
the adjustment mechanism includes an electromagnet disposed within the tube, attached to one of the tube and the rod, and configured to generate a magnetic field to adjust a viscosity of magnetorheological fluid contained within the tube.

7. The display assembly of claim 1 further comprising a locking mechanism configured to:
hold the at least one screen in position when the at least one screen is pushed against the instrument panel a first time; and
release the at least one screen when the at least one screen is pushed against the instrument panel a second time.

8. The display assembly of claim 1, wherein the adjustment mechanism includes a piston disposed within the tube, attached to the second end of the rod, and slidable relative to the tube.

9. A display assembly for a vehicle, the display assembly comprising:
an electronic display configured to be flexed to adjust a viewing angle of an occupant in the vehicle relative to the electronic display;
a plurality of slide tracks configured to be mounted to an instrument panel of the vehicle; and
a plurality of sliders coupled to the electronic display, wherein each slider of the plurality of sliders is configured to translate within one slide track of the plurality of slide tracks as the electronic display is flexed.

10. The display assembly of claim 9 wherein:
each slider of the plurality of sliders is configured to translate along a length of the electronic display while translating within one slide track of the plurality of slide tracks as the electronic display is flexed.

11. The display assembly of claim 9 wherein:
the electronic display includes a first screen, a second screen, and a first hinge disposed between the first and second screens;
the first screen is configured to be folded about the first hinge and flexed to adjust the viewing angle of the occupant relative to the second screen;
the plurality of slide tracks includes a first slide track configured to be mounted to the instrument panel; and
the plurality of sliders includes a first slider coupled to the first screen and configured to translate within the first slide track when the first screen is flexed.

12. The display assembly of claim 11 wherein:
the second screen is configured to be folded about the first hinge and flexed to adjust the viewing angle of the occupant relative to the second screen;
the plurality of slide tracks includes a second slide track configured to be mounted to the instrument panel; and
the plurality of sliders includes a second slider coupled to the second screen and configured to translate within the second slide track when the second screen is flexed.

13. The display assembly of claim 11 wherein:
the electronic display further includes a third screen and a second hinge disposed between the first and third screens;
the plurality of slide tracks includes a second slide track configured to be mounted to the instrument panel;
the plurality of sliders includes a second slider coupled to the third screen and configured to translate within the second slide track when the third screen is flexed; and
the third screen is configured to be folded about the second hinge and flexed to adjust the viewing angle of the occupant relative to the third screen.

14. The display assembly of claim 11 wherein:
the first screen is configured to have a flat profile when the second screen is flexed; and
the second screen is configured to have a curved profile when the second screen is flexed.

15. An infotainment system for a vehicle, the infotainment system comprising:
an electronic display configured to be at least one of flexed and folded to adjust a viewing angle of an occupant in the vehicle relative to the electronic display;
an actuator attached to the electronic display and configured to be mounted to an instrument panel of the vehicle;
a display control module configured to control the actuator to at least one of flex and fold the electronic display into any one of a plurality of configurations;
at least one sensor disposed within a cabin of the vehicle; and
an occupant module configured to determine a location of the occupant and a maximum reach of the occupant based on an input from the at least one sensor, wherein the display control module is configured to control the actuator to adjust the configuration of the electronic display based on the location and the maximum reach of the occupant.

16. The infotainment system of claim 15 further comprising a media type module configured to determine a type of media being displayed by the electronic display, wherein the display control module is configured to control the actuator to adjust the configuration of the electronic display based on the type of media.

17. The infotainment system of claim 15 wherein the electronic display includes a first screen and a second screen, wherein the display control module is configured to control the actuator to adjust the first screen to a first configuration and to adjust the second screen to a second configuration that is different from the first configuration.

18. The infotainment system of claim 17 wherein:
the first configuration yields a target viewing angle of the first screen for a first occupant located on a first side of the vehicle; and the second configuration yields a target viewing angle of the second screen for a second occupant located on a second side of the vehicle opposite of the first side.

19. The infotainment system of claim 17 further comprising:
- a first speaker configured to be mounted within a cabin of the vehicle;
- a second speaker configured to be mounted within the cabin of the vehicle; and
- a speaker control module configured to:
  - control the first speaker to generate audio corresponding to media being displayed on the first screen; and
  - control the second speaker to generate audio corresponding to media being displayed on the second screen.

20. The infotainment system of claim 15, wherein the electronic display includes multiple screens and at least one hinge disposed between the multiple screens, wherein the electronic display is configured to be folded at the at least one hinge by pivoting at least one screen of the multiple screens about the at least one hinge.

21. The infotainment system of claim 15, further comprising:
- a plurality of slide tracks configured to be mounted to the instrument panel of the vehicle; and
- a plurality of sliders coupled to the electronic display,
- wherein the electronic display is configured to be flexed and each slider in the plurality of sliders is configured to translate within one slide track in the plurality of slide tracks as the electronic display is flexed.

\* \* \* \* \*